United States Patent
Shiomi et al.

(10) Patent No.: US 7,496,356 B2
(45) Date of Patent: Feb. 24, 2009

(54) RADIO COMMUNICATION APPARATUS WITH THE FUNCTION OF A TELETYPEWRITER

(75) Inventors: Junichi Shiomi, Tokyo (JP); Ikuya Yamanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 394 days.

(21) Appl. No.: 11/057,425

(22) Filed: Sep. 29, 2003

(65) Prior Publication Data

US 2005/0170820 A1 Aug. 4, 2005

(51) Int. Cl.
 *H04L 29/08* (2006.01)
(52) U.S. Cl. ............. 455/414.4; 455/403; 455/414.1; 455/418
(58) Field of Classification Search ............ 455/414.1, 455/20–21, 561–563, 566, 569–1, 552.1, 455/556.1, 403, 414.4, 418
See application file for complete search history.

(56) References Cited

U.S. PATENT DOCUMENTS

| | | | |
|---|---|---|---|
| 7,099,440 B2 * | 8/2006 | Michaelis | 379/52 |
| 2002/0136368 A1 * | 9/2002 | Aoki et al. | 379/88.12 |
| 2005/0170828 A1 * | 8/2005 | Nakamura et al. | 455/419 |
| 2006/0025085 A1 * | 2/2006 | Van Bosch et al. | 455/99 |
| 2007/0274514 A1 * | 11/2007 | Ku et al. | 379/406.01 |

* cited by examiner

*Primary Examiner*—Alexander Eisen
*Assistant Examiner*—Eric Elcenko
(74) *Attorney, Agent, or Firm*—Finnegan, Henderson, Farabow, Garrett & Dunner, L.L.P.

(57) ABSTRACT

A radio communication apparatus for use in a radio communication system having a radio link between a base station and the radio communication apparatus. The radio communication apparatus comprises determining unit, a receiver, a speaker, a demodulator, and a display. The determining unit determines one of a plurality of operation modes of the apparatus. The receiver is configured to receive a received signal over the radio link. The speaker is configured to output a voice message based on the received signal when a first of the operation modes is determined. The demodulator is configured to demodulate the received signal into a character data when a second of the operation modes is determined. The display is configured to display the character data.

5 Claims, 30 Drawing Sheets

| ID | MODE |
|---|---|
| g | TTY1 |
| h | TTY3 |
| i | TTY3 |
| j | TTY1 |
| k | TTY2 |
| l | TTY3 |

FIG.16

| | TTY HOLDER | COMMUNICATION | USER | OPERATION MODE |
|---|---|---|---|---|
| 1 | HARD OF READING | → SPEECH →<br>← SPEECH ← | NORMAL | ORDINARY MODE |
| 2 | HARD OF SPEAKING | → CHARACTER →<br>← SPEECH ← | NORMAL | TTY MODE TTY1 |
| 3 | HARD OF HEARING | → SPEECH →<br>← CHARACTER ← | NORMAL | TTY MODE TTY2 |
| 4 | HARD OF SPEAKING & HEARING | → CHARACTER →<br>← CHARACTER ← | NORMAL | TTY MODE TTY3 |
| 5 | HARD OF READING | → SPEECH →<br>← SPEECH ← | HARD OF READING | ORDINARY MODE |
| 6 | HARD OF SPEAKING | → CHARACTER →<br>← CHARACTER ← | HARD OF SPEAKING | TTY MODE TTY3 |
| 7 | HARD OF SPEAKING | → CHARACTER →<br>← SPEECH ← | HARD OF HEARING | TTY MODE TTY1 |
| 8 | HARD OF HEARING | → SPEECH →<br>← CHARACTER ← | HARD OF SPEAKING | TTY MODE TTY2 |
| 9 | HARD OF HEARING | → CHARACTER →<br>← CHARACTER ← | HAED OF HEARING | TTY MODE TTY3 |
| 10 | HARD OF SPEAKING & HEARING | → CHARACTER →<br>← CHARACTER ← | HARD OF SPEAKING & HEARING | TTY MODE TTY3 |

FIG.25A

| | USER 1 | COMMUNICATION | USER 2 | OPERATION MODE |
|---|---|---|---|---|
| 1 | HARD OF READING | → SPEECH →<br>← SPEECH ← | NORMAL | 1: ORDINARY MODE<br>2: ORDINARY MODE |
| 2 | HARD OF SPEAKING | → CHARACTER →<br>← SPEECH ← | NORMAL | 1: TTY MODE TTY2<br>2: TTY MODE TTY1 |
| 3 | HARD OF HEARING | → SPEECH →<br>← CHARACTER ← | NORMAL | 1: TTY MODE TTY1<br>2: TTY MODE TTY2 |
| 4 | HARD OF SPEAKING & HEARING | → CHARACTER →<br>← CHARACTER ← | NORMAL | 1: TTY MODE TTY3<br>2: TTY MODE TTY3 |
| 5 | NORMAL | → SPEECH →<br>← SPEECH ← | HARD OF READING | 1: ORDINARY MODE<br>2: ORDINARY MODE |
| 6 | NORMAL | → SPEECH →<br>← CHARACTER ← | HARD OF SPEAKING | 1: TTY MODE TTY1<br>2: TTY MODE TTY2 |
| 7 | NORMAL | → CHARACTER →<br>← SPEECH ← | HARD OF HEARING | 1: TTY MODE TTY2<br>2: TTY MODE TTY1 |
| 8 | NORMAL | → CHARACTER →<br>← CHARACTER ← | HARD OF SPEAKING & HEARING | 1: TTY MODE TTY3<br>2: TTY MODE TTY3 |
| 9 | HARD OF READING | → SPEECH →<br>← SPEECH ← | HARD OF READING | 1: ORDINARY MODE<br>2: ORDINARY MODE |
| 10 | HARD OF SPEAKING | → CHARACTER →<br>← CHARACTER ← | HARD OF SPEAKING | 1: TTY MODE TTY3<br>2: TTY MODE TTY3 |
| 11 | HARD OF SPEAKING | → CHARACTER →<br>← SPEECH ← | HARD OF HEARING | 1: TTY MODE TTY2<br>2: TTY MODE TTY1 |
| 12 | HARD OF HEARING | → SPEECH →<br>← CHARACTER ← | HARD OF SPEAKING | 1: TTY MODE TTY1<br>2: TTY MODE TTY2 |
| 13 | HARD OF HEARING | → CHARACTER →<br>← CHARACTER ← | HAED OF HEARING | 1: TTY MODE TTY3<br>2: TTY MODE TTY3 |
| 14 | HARD OF SPEAKING & HEARING | → CHARACTER →<br>← CHARACTER ← | HARD OF SPEAKING & HEARING | 1: TTY MODE TTY3<br>2: TTY MODE TTY3 |

FIG.25B

RADIO COMMUNICATION APPARATUS WITH THE FUNCTION OF A TELETYPEWRITER

FIELD OF THE INVENTION

The present invention relates to a radio communication apparatus which is used in a radio communication system wherein a signal is transmitted over a radio link between a base station and the radio communication apparatus.

BACKGROUND OF THE INVENTION

A teletypewriter (hereinafter referred to as a TTY) has been developed and is used to aid communications by a person who has a difficulty, for example, in speech and/or hearing (hereinafter referred to as a TTY holder). Such a TTY holder can communicate with others in remote places by using the TTY. The TTY is usually connected to a telephone and in response to TTY holder's typing texts in the TTY, character signals based on the typed texts are transmitted through the telephone.

In recent years, radio communication apparatuses have been popularized. The radio communication apparatuses are, for example, used in a radio communication system or a mobile radio communication system, such as a portable telephone system or an automobile telephone system. Further, some or many types of the radio communication apparatuses are nowadays featured to be connectable to the TTY so as to allow the TTY holder to use the TTY outside the house through a radio communication apparatus. The TTY is, however, quite large in size and is usually cumbersome for the TTY holder to carry outside.

BRIEF SUMMARY OF THE INVENTION

According to a first aspect of the present invention, there is provided a radio communication apparatus for use in a radio communication system having a radio link between a base station and the radio communication apparatus. The radio communication apparatus comprises determining means, a receiver, a speaker, a demodulator, and a display. The determining means determines one of a plurality of operation modes of the apparatus. The receiver is configured to receive a reception signal over the radio link. The speaker is configured to output a voice message based on the reception signal when a first of the operation modes is determined. The demodulator is configured to demodulate the reception signal into a character data when a second of the operation modes is determined. The display is configured to display the character data.

According to a second aspect of the present invention, there is provided a radio communication apparatus for use in a radio communication system having a radio link between a base station and the radio communication apparatus. The radio communication apparatus comprises determining means, a microphone, an input unit, a display, a modulator, and a transmitter. The determining means determines one of a plurality of operation modes of the apparatus. The microphone is configured to input a speech signal. The input unit is configured to input a character data. The display is configured to display the character data. The modulator is configured to modulate the character data into a character signal when a first of the operation modes is determined. The transmitter is configured to transmit the speech signal over the radio link when a second of the operation modes is determined. The transmitter is further configured to transmit the character signal over the radio link when the first mode is determined.

According to a third aspect of the present invention, there is provided a method of processing a reception signal received in a radio communication apparatus for use in a radio communication system wherein the reception signal is transmitted over a radio link from a base station to the radio communication apparatus. The method begins by receiving the reception signal over the radio link. The method continues by determining one of a plurality of operation modes of the apparatus and outputting a voice message based on the reception signal when a first of the operation modes is determined. The method further continues by demodulating the reception signal into a character data when a second of the operation modes is determined and displaying the character data.

According to a fourth aspect of the present invention, there is provided a method of processing an input data that is provided to a radio communication apparatus for use in a radio communication system having a radio link between the radio communication apparatus and a base station. The method begins by determining one of a plurality of operation modes of the apparatus. The method continues by providing a character data or a speech data as the input data and displaying the character data. The method further continues by modulating the character data into a character signal when a first of the operation modes is determined and transmitting the character signal over the radio link when the first mode is determined and alternatively transmitting the speech signal over the radio link when a second of the operation modes is determined.

According to a fifth aspect of the present invention, there is provided a computer program product on which is stored a computer program for processing a reception signal which is received in a radio communication apparatus for use in a radio communication system wherein the reception signal is transmitted over a radio link from a base station to the radio communication apparatus. The computer program has instructions, which when executed, perform steps comprising determining one of a plurality of operation modes of the apparatus, causing the reception signal to be demodulated into a character data when a first of the operation modes is determined, and causing the character data to be displayed.

According to a sixth aspect of the present invention, there is provided a computer program product on which is stored a computer program for processing an input data that is provided to a radio communication apparatus for use in a radio communication system having a radio link between the radio communication apparatus and a base station. The computer program has instructions, which when executed, perform steps comprising determining one of a plurality of operation modes of the apparatus, causing a character data to be displayed when the character data is provided as the input data, causing the character data to be modulated into a character signal when a first of the operation modes is determined, and causing the character signal to be transmitted over the radio link when the first mode is determined.

According to a seventh aspect of the present invention, there is provided a radio communication apparatus for use in a radio communication system having a radio link between a base station and the radio communication apparatus. The radio communication apparatus comprises determining means, a receiver, a speaker, a demodulator, a microphone, an input unit, a display, a modulator, and a transmitter. The determining means determines one of a plurality of operation modes of the apparatus. The receiver is configured to receive a reception signal over the radio link. The speaker is configured to output a first voice message based on the reception signal when a first of the operation modes is determined. The demodulator is configured to demodulate the reception signal into a first character data when a second of the operation modes is determined. The microphone is configured to input a speech signal. The input unit is configured to input a second character data. The display is configured to display the second character data. The modulator is configured to modulate the second character data into a character signal when the second mode is determined. The transmitter is configured to transmit the speech signal over the radio link when the first mode is determined. The transmitter is further configured to transmit the second character signal over the radio link when the second mode is determined.

BRIEF DESCRIPTION OF THE DRAWINGS

A more complete appreciation of embodiments of the present invention and many of its attendant advantages will be readily obtained by reference to the following detailed description considered in connection with the accompanying drawings, in which:

FIG. 16 is an illustration showing an example of an ID table according to a fourth embodiment of the present invention;

FIG. 25A is a table showing exemplary combinations of communications between a telephone having a TTY terminal and the radio communication apparatus when operated according the fourth embodiment of the present invention; and FIG. 25B is a table showing exemplary combinations of communications between a first and a second of the radio communication apparatuses when operated according the fourth embodiment of the present invention.

DETAILED DESCRIPTION OF THE PREFERRED EMBODIMENTS

Embodiments of the present invention will be described with reference to the accompanying drawings. According to the following description, a radio communication apparatus which is operative in a CDMA (Code Division Multiple Access) cellular radio communication system will be described as an example of radio communication apparatuses according to embodiments of the present invention. Embodiments of the present invention, however, may not be limited to such a CDMA radio communication apparatus, but may also be applied to radio communication apparatuses operative in any other type of radio communication systems, such as, for example, a TDMA (Time Division Multiple Access) system. Embodiments of the present invention also may be applied to not only a single mode (CDMA or TDMA) radio communication system, but also a plurality of modes (CDMA and TDMA, or CDMA and FDMA (Frequency Division Multiple Access) or TDMA and FDMA or CDMA and TDMA and FDMA or like this) radio communication system.

First Embodiment

A first embodiment of the present invention will describe a CDMA cellular mobile radio communication apparatus (hereinafter referred to as a radio communication apparatus) which is also operative to receive and display character signals transmitted from a TTY terminal through a base station provided in an area where the radio communication apparatus belongs in the CDMA cellular radio communication system. The character signals, form character streams (or character data set) which may represent message (or chat) texts, predetermined messages, and/or the like. The character streams may be ASCII character streams.

Figure 1:
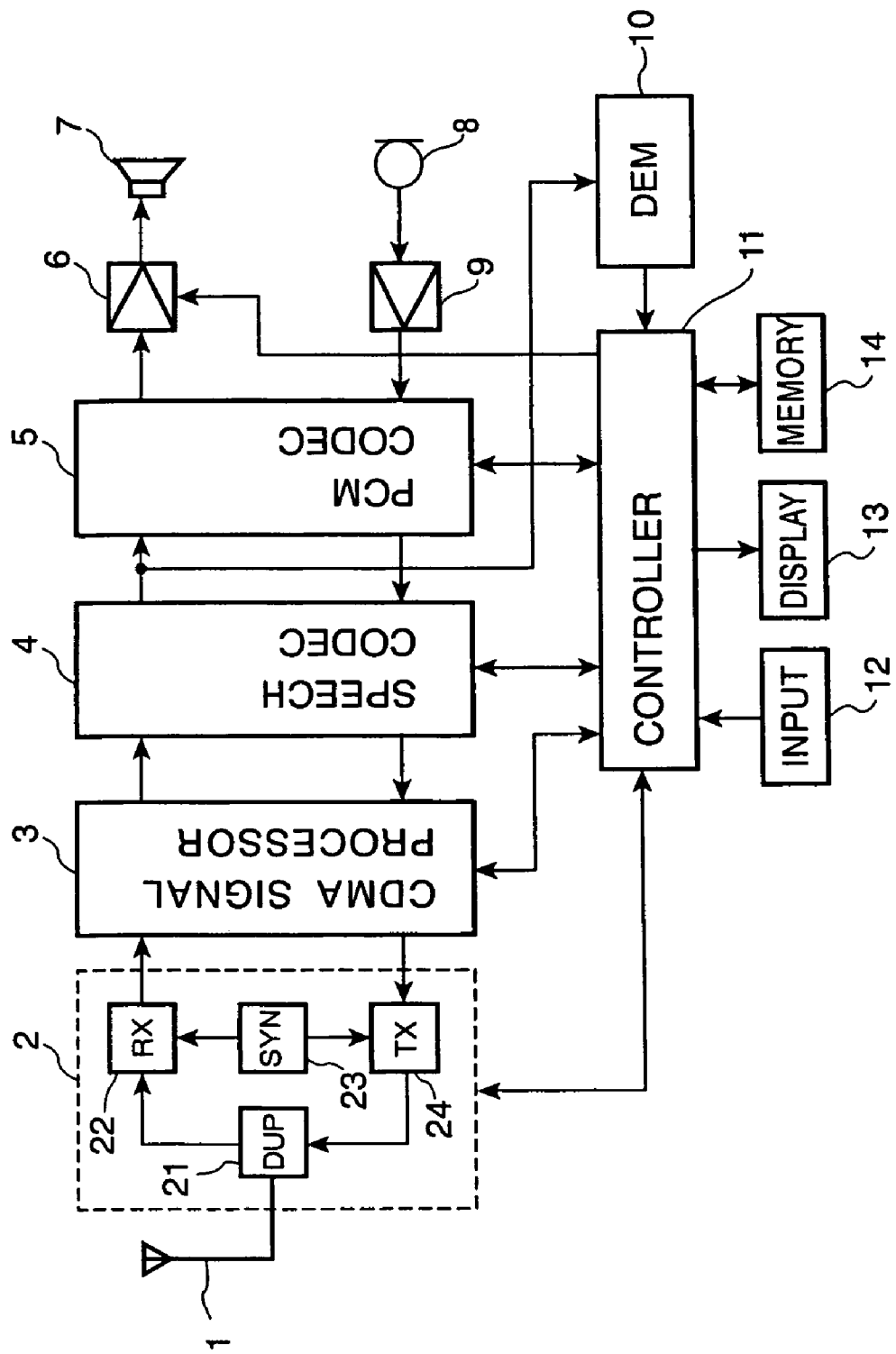
FIG. 1 is a block diagram showing an exemplary configuration of a radio communication apparatus according to a first embodiment of the present invention.

FIG. 1 is a block diagram showing an exemplary configuration of the radio communication apparatus according to the first embodiment of the present invention.

The radio communication apparatus includes an antenna 1, a radio unit 2, a CDMA signal processor 3, a speech coding and decoding unit (hereinafter referred to as a speech codec) 4, a pulse code modulation coding and decoding unit (hereinafter referred to as a PCM codec) 5, a reception amplifier 6, a speaker 7, a microphone 8, a transmission amplifier 9, and a TTY demodulator 10. The radio communication apparatus further includes a controller 11, an input unit 12, a display 13, and a memory 14.

The radio unit 2 includes a duplexer 21, a receiver 22, a synthesizer 23, and a transmitter 24.

The radio communication apparatus including the above described components may be operated as follows. The receiver 22 receives radio frequency signals through the antenna 1 and the duplexer 21 from the base station over a radio link. The receiver 22 also receives local oscillation signals of a predetermined frequency from the synthesizer 23 and mixes the radio frequency signals with the local oscillation signals. Accordingly, the receiver 22 converts the received radio frequency signals into intermediate frequency signals and provides the CDMA signal processor 3 with the intermediate frequency signals. The predetermined frequency of the local oscillation signals may be designated or controlled by the controller 11.

In the CDMA signal processor 3, a quadrature demodulation, such as, for example, a quadrature phase shift keying (QPSK) demodulation, is implemented on the intermediate frequency signals. The demodulated signals are despread in accordance with a pseudonoise offset or code (hereinafter referred to as a PN code) assigned to each reception channel. Accordingly, the intermediate frequency signals are converted to demodulated data signals in a format according to a predetermined data rate. The demodulated data signals are provided to the speech codec 4, and data signals representing the predetermined data rate are provided to the controller 11 as reception data rate.

The speech codec 4 decompresses (or expands) the demodulated data signals in accordance with the reception data rate supplied from the controller 11. Further, the speech codec 4 decodes the decompressed signals, using a Viterbi decoding technique or the like. In addition, an error correction decoding processing is implemented on the decompressed signals. Accordingly, digital speech signals are reproduced in the speech codec 4.

When it is a speech communication between a user of the radio communication apparatus and a party the user communicates, a PCM decoding processing is implemented on the digital speech signals in the PCM codec 5 and accordingly analog speech signals are output to the reception amplifier 6. The reception amplifier 6 amplifies analog speech signals and outputs to the speaker 7 as voice data.

Also when it is a speech communication between the user and the party, a voice uttered by the user is input to the microphone 8. The microphone outputs analog speech signals based on the voice. The transmission amplifier 9 amplifies analog speech signals. In the PCM codec 5, a PCM coding processing is implemented on the amplified analog speech signals and accordingly digital speech signals are output to the speech codec 4.

The speech codec 4 detects an energy amount based on the digital speech signals and determines a transmission data rate based on the energy amount. The speech codec 4 also compresses the digital speech signals into burst signals in a predetermined format according to the transmission data rate. Further, an error correction coding processing is implemented on the burst signals and accordingly the error corrected burst signals are provided to the CDMA signal processor 3. The speech codec 4 also provides the controller 11 with the transmission data rate.

The CDMA signal processor 3 spreads the error corrected burst signals in accordance with a PN code assigned to each transmission channel. Further, a quadrature modulation, such as, for example, a QPSK modulation, is implemented on the spread burst signals. The modulated signals are provided to the transmitter 24.

The transmitter 24 receives local oscillation signals of a predetermined frequency from the synthesizer 23 as well as the modulated signals. The modulated signals are mixed with the local oscillation signals and converted into radio frequency burst signals. Further, the transmitter 24 amplifies the radio frequency burst signals according to the transmission data rate provided from the controller 11. The amplification is implemented on an effective part of the radio frequency burst signals. The amplified radio frequency burst signals are transmitted through the duplexer 21 and the antenna 1 as transmission signals to the base station over a radio link.

When it is a character communication between the user and the party (that is, the TTY holder), the character signals received by the antenna 1 are processed as audio signals, (or speech signals) up to the speech codec 4 in a manner similar to the above description. The speech codec 4 notices the controller 11 about that the character signals are input to the speech codec 4. Further, the character signals in a form of digital audio (speech) signals output from the speech codec 4 are provided to the TTY demodulator 10 according to the first embodiment of the present invention. Although the character signals are provided to the PCM codec 5 and further on to the speaker 7 as described before, the user can only hear a signal sound representing the character signals. Since the sound does not make sense as a language, the controller 11 may render the reception amplifier 6 inoperative in response to the notice from the speech codec 4. Alternatively, the controller 11 may render a whole part or only a decoding part of the PCM codec 5 inoperative so that no signal is input to the reception amplifier 6. Rendering those inoperative may be accomplished by terminating a power supply to those or terminating clock signals for their operations, for example.

Figure 2:
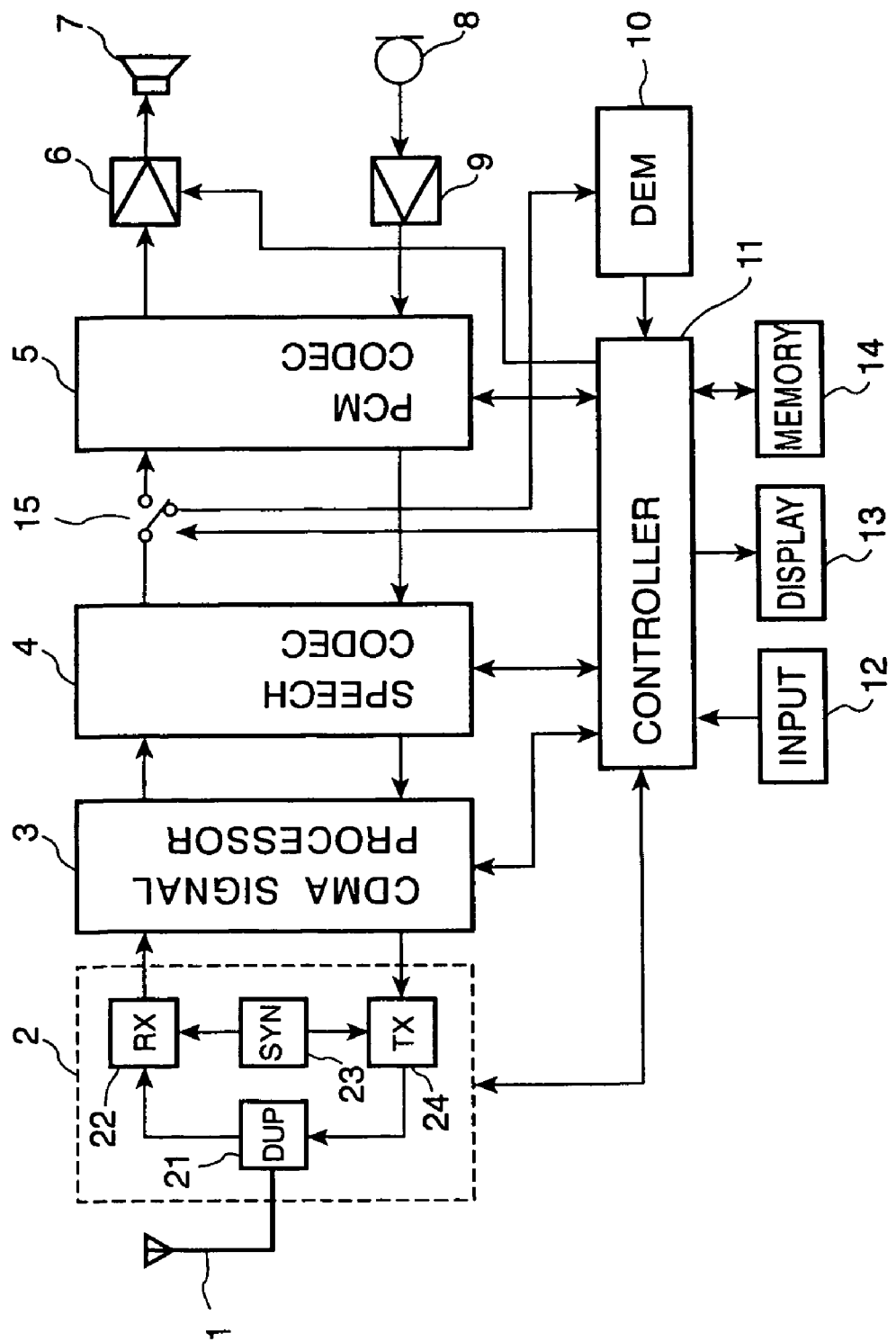
FIG. 2 is a block diagram showing another exemplary configuration of the radio communication apparatus according to the first embodiment of the present invention.

Still another example of avoiding the character signals from outputting from the speaker 7 is shown in FIG. 2. FIG. 2 is a block diagram showing another exemplary configuration of the radio communication apparatus according to the first embodiment of the present invention. As shown in FIG. 2, a switch 15 is provided between the speech codec 4 and the PCM codec 5 in a reception system of the radio communication apparatus. The switch 15 is also connected to the TTY demodulator 10. When it is a speech communication between the user and the party, the controller 11 controls the switch 15 to connect the speech codec 4 to the PCM codec 5. On the other hand, when it is a character communication between the user and the party, the controller 11 controls the switch 15 to connect the speech codec 4 to the TTY demodulator 10 so as to avoid the character signals from outputting from the speaker 7. Since no signal is input to the PCM codec 5 and the reception amplifier 6, the controller 11 may also render those inoperative as described above.

Turning back to FIG. 1, the TTY demodulator 10 decodes and converts the character signals into character streams, such as, for example, ASCII character streams as mentioned before. The character streams are provided to the controller 11. According to the first embodiment of the present invention, the radio communication apparatus has a feature that allows the radio communication apparatus only to receive character signals transmitted from a TTY terminal of the party (the TTY holder) over a radio link. Therefore, the radio communication apparatus according to the first embodiment does not include a TTY modulator that allows a character signal transmission.

Figure 5:
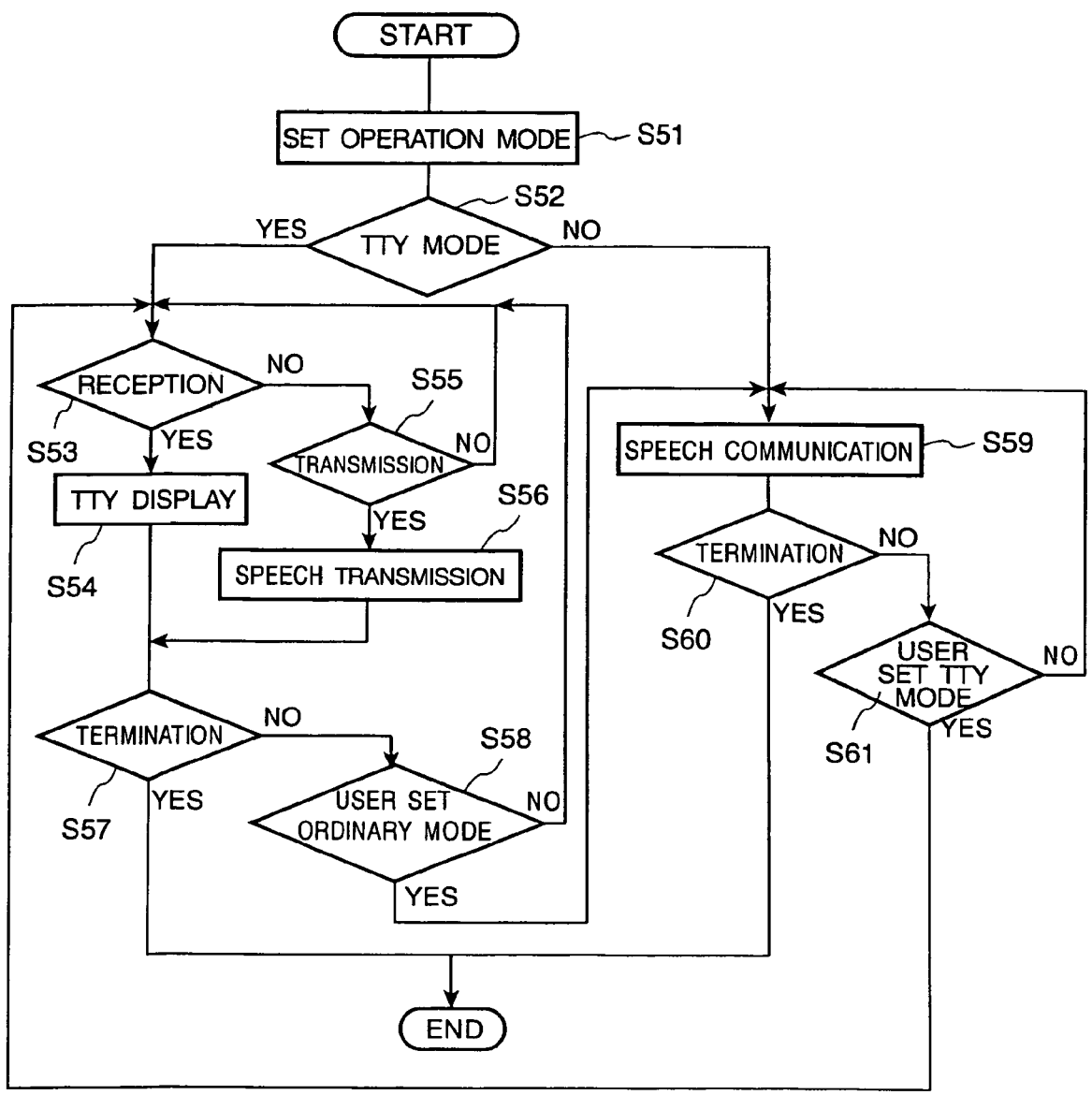
FIG. 5 is a flowchart showing another example of communication by the radio communication apparatus according to the first embodiment of the present invention.

The controller 11 controls each component of the radio communication apparatus and particularly executes determinations and processing according to flowcharts shown in FIG. 3 or 5 which will be described later. The input unit 12 includes numeral keys and several function keys including an on-hook key and an off-hook key. The user can input a telephone number for a call origination using the numeral keys. The telephone number is of the party's telephone (a radio communication or a wired telephone) which will communicate with the radio communication apparatus whether the party's telephone is connected to the TTY terminal or not.

The display 13 may comprise a liquid crystal display (LCD) and displays various kinds of information. For example, a telephone number for a cell origination is displayed in the display 13. A telephone number of the party's telephone which has originated a call to the radio communication apparatus may also be displayed in the display 13. Further in the display 13, a battery level and a received signal strength indicator level may be displayed. When the character signals have been received, the character streams provided to the controller 11 from the TTY demodulator 10 are sent to the display 13 and displayed as text messages in the display 13.

The memory 14 stores operation programs, such as to be executed in the controller 11, for operating the radio communication apparatus. The operation programs include programs for executing the analysis, determinations, and processing according to flowcharts shown in FIG. 3 or 5 which will be described later. The memory 14 also stores various kinds of conditions and information which have been set at the time of shipment, by a service company, and/or by the user. An ID table showing identification numbers of TTY holders is stored as part of such information in the memory 14. The identification numbers are, for example, telephone numbers. Still further, the memory 14 may also store a log of the character streams (text messages) displayed in the display 13.

Next, an operation of the radio communication apparatus according to the first embodiment of the present invention will be described with reference to FIG. 3. FIG. 3 is a flowchart showing an example of communication by the radio communication apparatus according to the first embodiment of the present invention. In the first embodiment, the party is assumed to be able to hear but hard of speaking as the TTY holder, but may alternatively be normal in speech communication.

The party's telephone may be wired telephone or a radio communication which is connected to a TTY. The TTY does not have to be a conventional TTY terminal but may alternatively be a TTY feature incorporated in the party's radio communication which will be described as a second or a third embodiment of the present invention. In any case, even if it is a conventional telephone without the TTY feature or the TTY terminal, such a telephone which communicates with the radio communication apparatus according to embodiments of the present invention is hereinafter referred to as a TTY telephone.

The radio communication apparatus according to the first embodiment of the present invention is in a stand-by status after a power switch has been switched on. During the stand-by status, the controller 11 determines whether incoming signals have been received from the TTY telephone or not (step S31). If the controller 11 determines that incoming signals have been received, the controller 11 further determines whether the incoming signals include an identification number, such as a telephone number, of the TTY telephone (step S32). If an identification number is included in the incoming signals, information of the identification number is provided to the controller 11 from the CDMA signal processor 3. If the incoming signals do not include any identification number, an ordinary mode is set up as an operation mode of the radio communication apparatus (step S33). When the controller 11 determines that the incoming signals include an identification number in step S32, the controller 11 refers to the ID table showing identification numbers of TTY holders stored in the memory 14 (step S34).

While incoming signals are not detected in step S31, the controller 11 also determines whether or not a call is originated by the user's input of an identification number and the off-hook operation (step S35). If no call is originated, the controller 11 repeats the determination of incoming signals detection and call origination. When the controller 11 determines that a call has been originated, the controller 11 also refers to the ID table stored in the memory 14 (step S34).

Figure 4:
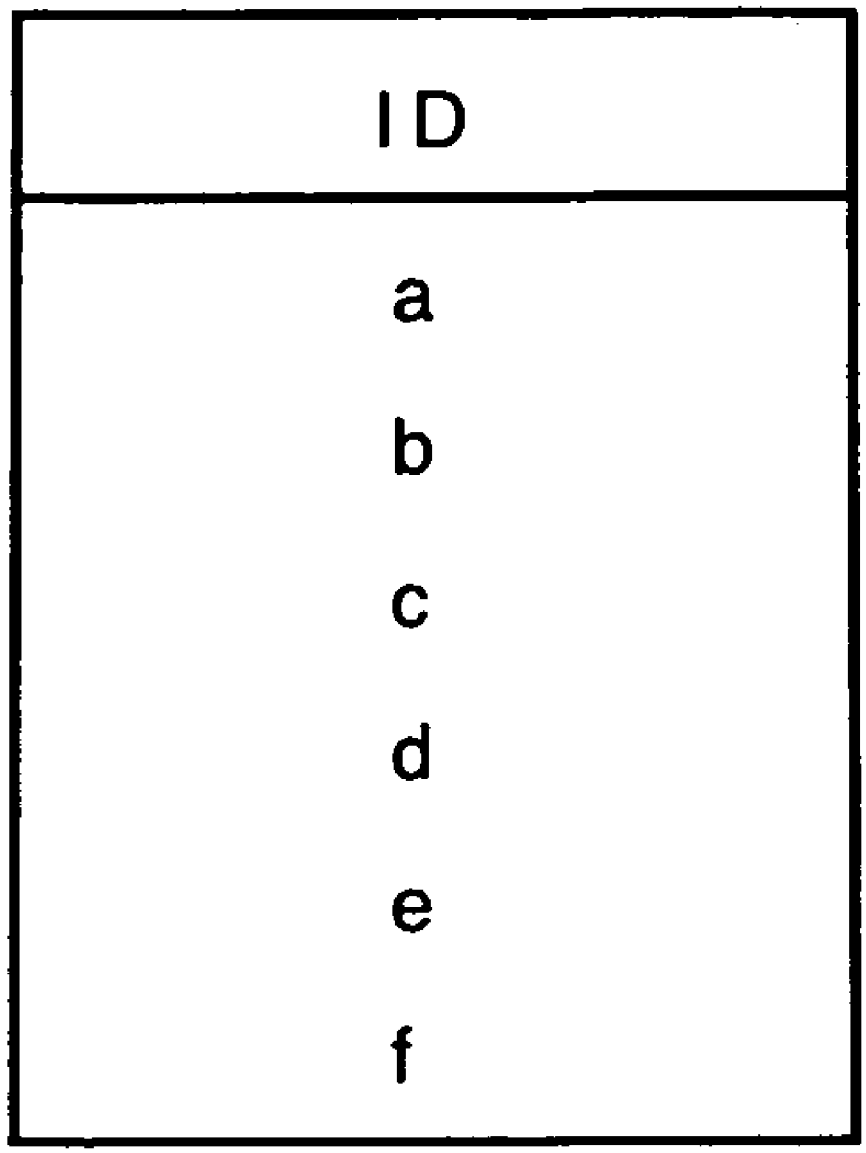
FIG. 4 is an illustration showing an example of an ID table according to the first embodiment of the present invention.

FIG. 4 is an illustration showing an example of the ID table stored in the memory 14 according to the first embodiment of the present invention. The table in FIG. 4 shows that identification numbers a to f are registered as TTY holders. This indicates that it is preferable that the radio communication apparatus is operative in a TTY mode when the ID table includes the identification number included in the incoming signals or input by the user.

Therefore, the controller 11 determines whether the ID table includes the identification number included in the incoming signals or input by the user (step S36). If the identification number is not included in the ID table, the controller 11 determines to set the ordinary mode (step S33). In the ordinary mode, the radio communication apparatus communicates with the TTY telephone in speech. In this case, the TTY telephone may not be a telephone with the TTY feature or the TTY terminal. Operations in the ordinary mode will be described later. In step S36, when the controller 11 has determined that the identification number is included in the ID table stored in the memory 14, a TTY mode is set up as an operation mode of the radio communication apparatus (step S37).

In the TTY mode according to the first embodiment of the present invention, when signals are received from the TTY telephone through the base station over the radio link (step S38), the received signals are displayed as text messages in the display 13 (step S39). The displayed text messages may be stored as a log of the communication in the memory 14. Since it is determined that the identification number is included in the ID table, the received signals are likely to be character signals. Therefore, the received signals are decoded and converted to character streams, such as ASCII character streams, and displayed in characters representing the text messages.

While waiting for the signal reception, if the user talks to the microphone 8 (step S40), speech signals based on the talks are modulated and transmitted as burst signals of a radio frequency as described in FIG. 1 (step S41). During such a communication, the controller 11 determines whether the communication is terminated or not by the on-hook switch or maybe by an on-hook operation at the TTY telephone's end (step S42). While the communication is not terminated and continues, the controller 11 also determines whether the operation mode is changed to the ordinary mode in response to the user's input operation with the input unit 12 or not (step S43). Such a user's operation may happen if the TTY telephone has sent speech signals which the user recognized in the display 13 where text messages are not displayed but unreadable at all. In this situation, the user may change the operation mode for himself or herself. Accordingly, a speech communication will be enabled (step S44).

Turning now to the ordinary mode, the radio communication apparatus carries out a speech communication with the TTY telephone. In other words, the user talks to the microphone 8 and hears a voice from the speaker 7 (step S44). During such a speech communication, the controller 11 determines whether the communication is terminated or not by the on-hook switch or maybe by an on-hook operation at the TTY telephone's end (step S45). While the communication is not terminated and continues, the controller 11 also determines whether the operation mode is changed to the TTY mode in response to the user's input operation with the input unit 12 or not (step S46). Such a user's operation may happen if the TTY telephone has sent character signals which the user recognized in the sound heard from the speaker 7. In this situation, the user may change the operation mode for himself or herself. Accordingly, the TTY mode communication will be enabled (step S38).

During the communication in the TTY mode or the ordinary mode, when the controller 11 has recognized the on-hook switch operation or the termination at the TTY telephone's end (step S42 or S45), the communication is terminated.

Figure 3:
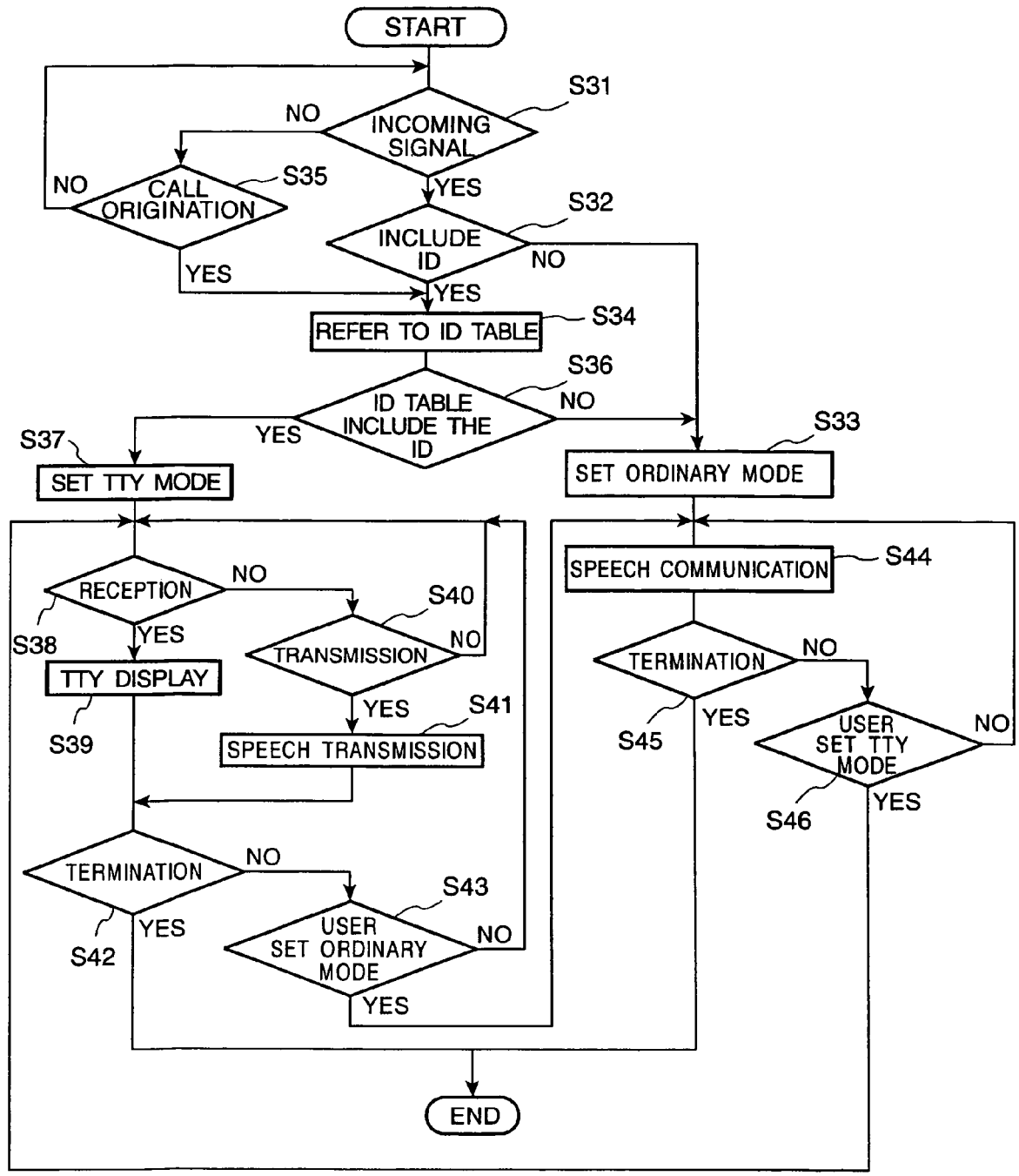
FIG. 3 is a flowchart showing an example of communication by the radio communication apparatus according to the first embodiment of the present invention.

In the flowchart shown in FIG. 3, an initial state of the operation mode (also referred to as the initial operation mode) of the radio communication apparatus has been determined according to whether an identification number included in the incoming signals or input by the user is included in the ID table or not. The initial operation mode may alternatively be determined only according to an initial set of the operation mode as shown in FIG. 5. FIG. 5 is a flowchart showing another example of communication with the TTY telephone by the radio communication apparatus according to the first embodiment of the present invention.

The radio communication apparatus is in a stand-by status after a power switch has been switched on. During the stand-by status, the user sets up the operation mode, which is the TTY mode or the ordinary mode. Alternatively, an operation mode (the TTY mode or the ordinary mode) set up at the time of shipment or set up by the service company may be used (or set up) as the initial operation mode of the radio communication apparatus in case that the user does not set up the operation mode for himself or herself during the stand-by status (step S51).

The controller 11 determines whether the initial operation mode is the TTY mode or not (step S52). When the controller 11 has determined the TTY mode, the TTY mode communication will be made according to steps S53 to S58. The steps S53 to S58 are the same as the steps S38 to S43 shown in FIG. 3 and therefore explanations for the steps S53 to S58 are omitted herein. When the controller 11 has determined the ordinary mode, the speech communication will be made according to steps S59 to S61. The steps S59 to S61 are the same as the steps S44 to S46 shown in FIG. 3 and therefore explanations for the steps S59 to S61 are omitted herein.

Second Embodiment

A second embodiment of the present invention will describe a radio communication apparatus which is also operative to input and transmit character signals to be transmitted to the TTY telephone through a base station provided in an area where the radio communication apparatus belongs in the CDMA cellular radio communication system. The character signals form character streams (or character data set) which may represent message (or chat) texts, predetermined messages, and/or the like. The character streams may be ASCII character streams.

Figure 6:
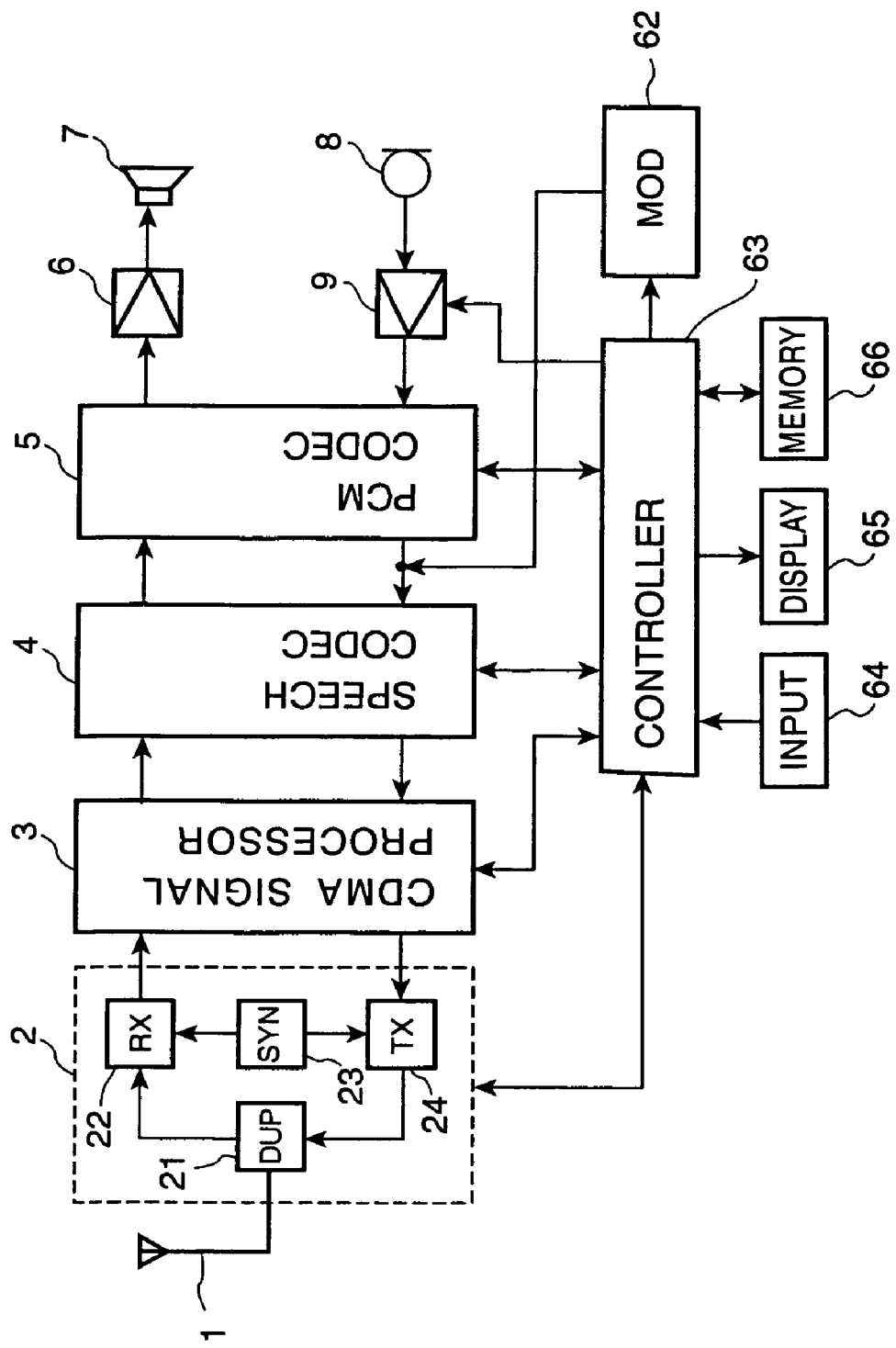
FIG. 6 is a block diagram showing an exemplary configuration of the radio communication apparatus according to a second embodiment of the present invention.

FIG. 6 is a block diagram showing an exemplary configuration of the radio communication apparatus according to the second embodiment of the present invention. In FIG. 6, components, which are operative in a manner similar to the components shown in FIG. 1 are given the same reference numbers and are omitted detailed explanations.

In comparison with the first embodiment of the present invention, the radio communication apparatus includes a TTY modulator 62, a controller 63, an input unit 64, a display 65, and a memory 66.

The radio communication apparatus including the above described components may be operated as follows. When it is a speech communication between the user and a party holding the TTY telephone, operations of the radio communication apparatus are implemented as described in the first embodiment.

When it is a character communication between the user and the party, character streams, such as, for example, ASCII character streams as mentioned before, are generated in response to the user's input operation with the input unit 64 and are provided to the TTY modulator 62 through the controller 63. The TTY modulator 62 codes and converts the character streams into character signals. The character signals in a digital form are provided to the speech codec 4. According to the second embodiment of the present invention, the radio communication apparatus has a feature that allows the radio communication apparatus only to transmit character signals to the TTY telephone over a radio link. Therefore, the radio communication apparatus according to the second embodiment does not include a TTY demodulator that allows a character signal reception.

The character signals provided to the speech codec 4 are processed as audio signals (or speech signals) up to the receiver 2 in a manner similar to the processing of the speech signals to be transmitted as described in the first embodiment of the present invention. Accordingly, the character signals converted to a predetermined radio frequency are transmitted from the antenna 1 to the base station over a radio link, and further on to the TTY telephone.

When the character signals are transmitted, the microphone 8, the transmission amplifier 9, and the PCM codec 5 are not used for the transmission. According to the second embodiment of the present invention, it may be a case that a holder of the TTY telephone is hard of hearing. This means that it is not preferable but useless to transmit speech signals. Therefore, the controller 63 may render the transmission amplifier 9 inoperative in response to the reception of the character streams from the input unit 64. Alternatively or in addition, the controller 63 may render a whole part or only a coding part of the PCM codec 5 inoperative so that no speech signal is input to the coding part of the speech codec 4. Rendering those inoperative may be accomplished by terminating a power supply to those or terminating clock signals for their operations, for example.

Figure 7:
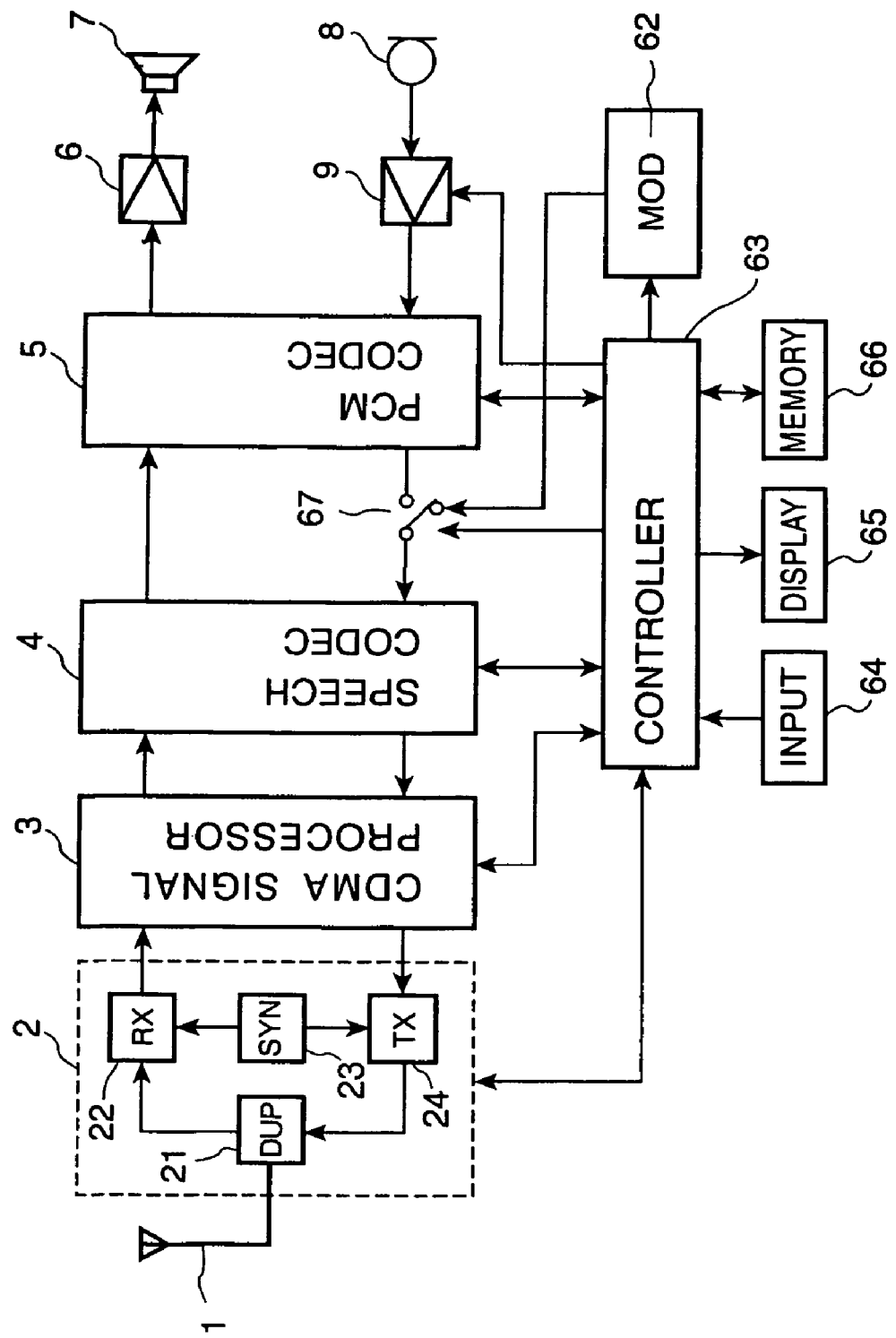
FIG. 7 is a block diagram showing another exemplary configuration of the radio communication apparatus according to the second embodiment of the present invention.

Still another example of avoiding speech signals from inputting to the coding part of the speech codec 4 is shown in FIG. 7. FIG. 7 is a block diagram showing another exemplary configuration of the radio communication apparatus according to the second embodiment of the present invention. As shown in FIG. 7, a switch 67 is provided between the speech codec 4 and the PCM codec 5 in a transmission system of the radio communication apparatus. The switch 67 is also connected to the TTY modulator 62. When it is a speech communication between the user and the party, the controller 63 controls the switch 67 to connect the speech codec 4 to the PCM codec 5. On the other hand, when it is a character communication between the user and the party, the controller 63 controls the switch 67 to connect the speech codec 4 to the TTY modulator 62 so as to avoid speech signals, if input from the microphone 8, from inputting to the speech codec 4. Since it is not necessary for the transmission amplifier 9 and the PCM codec 5 to be operative, the controller 63 may also render those inoperative as described above.

The controller 63 controls each component of the radio communication apparatus and particularly executes analysis, determinations, and processing according to flowcharts shown in FIG. 8 or 9 which will be described later. The input unit 64 includes numeral keys and several function keys including an on-hook key and an off-hook key. The user can input a telephone number for a call origination using the numeral keys. The telephone number is of the party's TTY telephone. The input unit 64 is also used for inputting characters which may construct character streams representing text messages. The input unit 64 may further have additional keys for the character input. Alternatively, conventional keys, such as numeral keys and function keys, may be used for the character input which may be operative in a different manner when the TTY mode is set up.

The display 65 may comprise a liquid crystal display (LCD) and displays various kinds of information. For example, a telephone number for a call origination is displayed in the display 65. A telephone number of the TTY telephone which has originated a call to the radio communication apparatus may also be displayed in the display 13. Further in the display 13, a battery level and a received signal strength indicator level may be displayed. When character streams have been input from the input unit 64, the character streams provided to the controller 63 from the input unit 64 are sent to the display 65 and displayed in the display 13 so that the user can recognize and confirm what he or she has input for transmission. The character streams input from the input unit 64 are transmitted substantially in real time as similar to a typical TTY feature.

The memory 66 stores operation programs, such as to be executed in the controller 63, for operating the radio communication apparatus. The operation programs include programs for executing the determinations and processing according to flowcharts shown in FIG. 8 or 9 which will be described later. The memory 66 also stores various kinds of conditions and information which have been set at the time of shipment, by a service company, and/or by the user. An ID table showing identification numbers of TTY telephones is stored as part of such information in the memory 66. The identification numbers are, for example, telephone numbers. The ID table may be similar to that shown in FIG. 4. Still further, the memory 66 may also store a log of the character streams (text messages) displayed in the display 65.

Next, an operation of the radio communication apparatus according to the second embodiment of the present invention will be described with reference to FIG. 8. FIG. 8 is a flowchart showing an example of communication with the TTY telephone by the radio communication apparatus according to the second embodiment of the present invention. A holder of the TTY telephone is assumed to be able to speak but hard of hearing as the TTY holder, but may alternatively be normal in speech communication according to the second embodiment. The TTY telephone may be as defined in the first embodiment. The TTY telephone may, however, alternatively be a radio communication incorporating the TTY feature described in the first embodiment of the present invention.

The radio communication apparatus according to the second embodiment is in a stand-by status after a power switch has been switched on. During the stand-by status, the controller 63 determines whether incoming signals have been received from the TTY telephone or not (step S81). If the controller 63 determines that incoming signals have been received, the controller 63 further determines whether the incoming signals include an identification number, such as a telephone number, of the TTY telephone (step S82). If an identification number is included in the incoming signals, information of the identification number is provided to the controller 63 from the CDMA signal processor 3. If the incoming signals do not include any identification number, an ordinary mode is set up as an operation mode of the radio communication apparatus (step S83). When the controller 63 determines that the incoming signals include an identification number in step S82, the controller 63 refers to the ID table showing identification numbers of TTY holders stored in the memory 66 (step S84).

While incoming signals are not detected in step S81, the controller 63 also determines whether or not a call is originated by the user's input of an identification number and the off-hook operation (step S85). If no call is originated, the controller 63 repeats the determination of incoming signals detection and call origination. When the controller 63 determines that a call has been originated, the controller 63 also refers to the ID table stored in the memory 66 (step S84).

Next, the controller 63 determines whether the ID table includes the identification number included in the incoming signals or input by the user (step S86). If the identification number is not included in the ID table, the controller 63 determines to set the ordinary mode (step S83). In the ordinary mode, the radio communication apparatus communicates with the TTY telephone in speech. In this case, the TTY telephone may not be a telephone with the TTY feature or the TTY terminal. Operations in the ordinary mode will be described later. In step S86, when the controller 63 has determined that the identification number is included in the ID table stored in the memory 66, a TTY mode is set up as an operation mode of the radio communication apparatus (step S87).

In the TTY mode according to the second embodiment of the present invention, when signals are received from the TTY telephone through the base station over the radio link (step S88), the received signals are output from the speaker 7 as voice messages (step S89).

While waiting for the signal reception, if the user inputs characters with the input unit 64 (step S90), character streams based on the character input operation are displayed in the display 65. The character streams are also modulated to character signals and transmitted as burst signals of a radio frequency (step S91). The displayed character streams may be stored as a log of the communication in the memory 66. Since it is determined that the identification number is included in the ID table, the TTY telephone is likely to have a TTY terminal or a TTY feature as in the case of the radio communication apparatus according to the first or a third embodiment of the present invention. Therefore, the character streams, such as ASCII character streams, representing the text messages are coded and converted to character signals, and transmitted to the base station over the radio link and further on to the TTY telephone.

During such a communication, the controller 63 determines whether the communication is terminated or not by the on-hook switch or maybe by an on-hook operation at the TTY telephones end (step S92). While the communication is not terminated and continues, the controller 63 also determines whether the operation mode is changed to the ordinary mode in response to the user's input operation with the input unit 64 or not (step S93). Such a user's operation may happen if the user is told by a holder of the TTY telephone that the TTY telephone does not display the character signals or the TTY telephone holder can communicate in speech (can hear a voice). In this situation, the user may change the operation mode for himself or herself. Accordingly, a speech communication will be enabled (step S94).

Turning now to the ordinary mode, the radio communication apparatus carries out a speech communication with the TTY telephone. In other words, the user talks to the microphone 8 and hears a voice from the speaker 7 (step S94). During such a speech communication, the controller 63 determines whether the communication is terminated or not by the on-hook switch or maybe by an on-hook operation at the TTY telephone's end (step S95). While the communication is not terminated and continues, the controller 63 also determines whether the operation mode is changed to the TTY mode in response to the user's input operation with the input unit 64 or not (step S96). Such a user's operation may happen if the user is told by the holder of the TTY telephone that the TTY telephone holder cannot hear a voice and so send in characters. In this situation, the user may change the operation mode for himself or herself. Accordingly, the TTY mode communication will be enabled (step S88).

During the communication in the TTY mode or the ordinary mode, when the controller 63 has recognized the on-hook switch operation or the termination at the TTY telephone's end (step S92 or S95), the communication is terminated.

Figure 8:
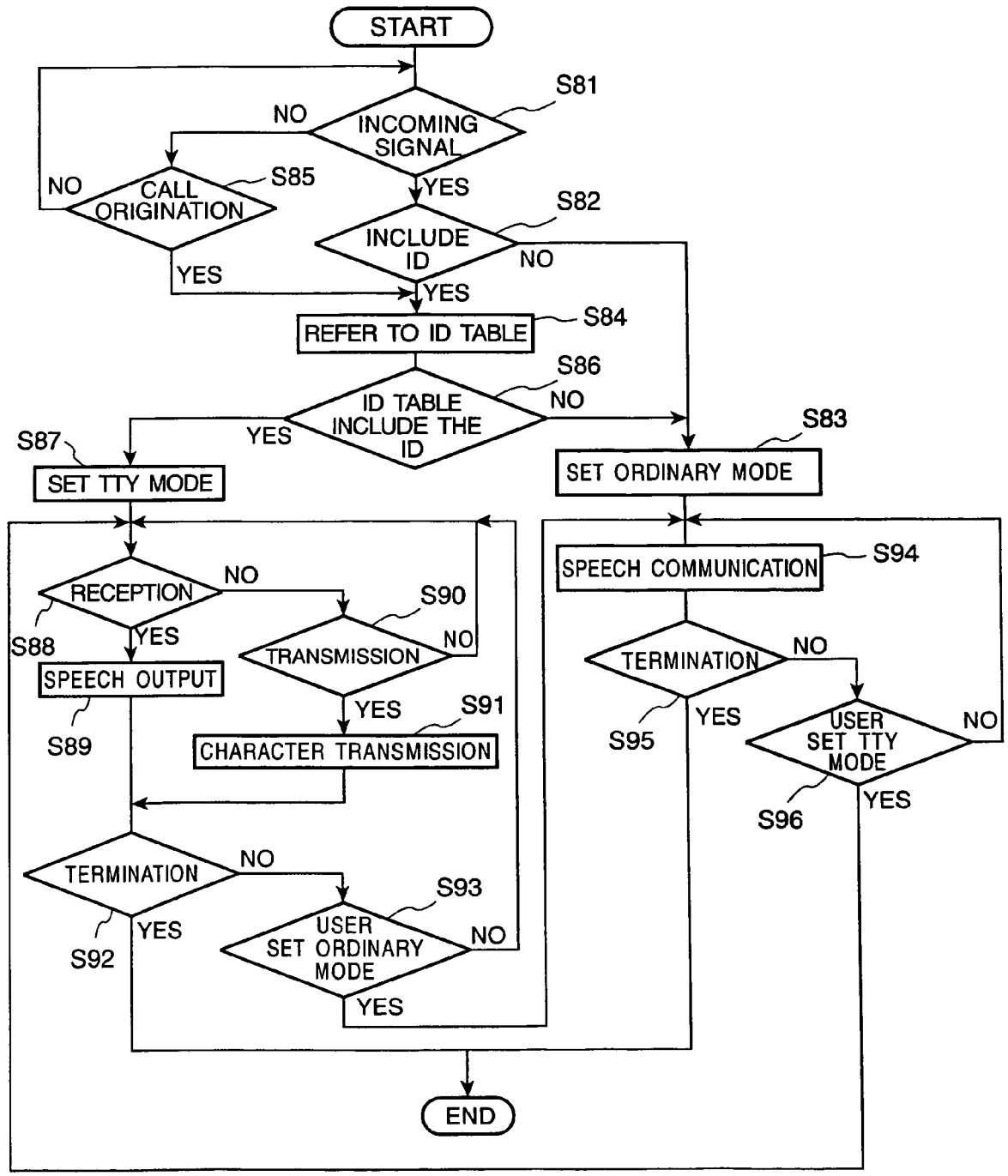
FIG. 8 is a flowchart showing an example of communication by the radio communication apparatus according to the second embodiment of the present invention.
Figure 9:
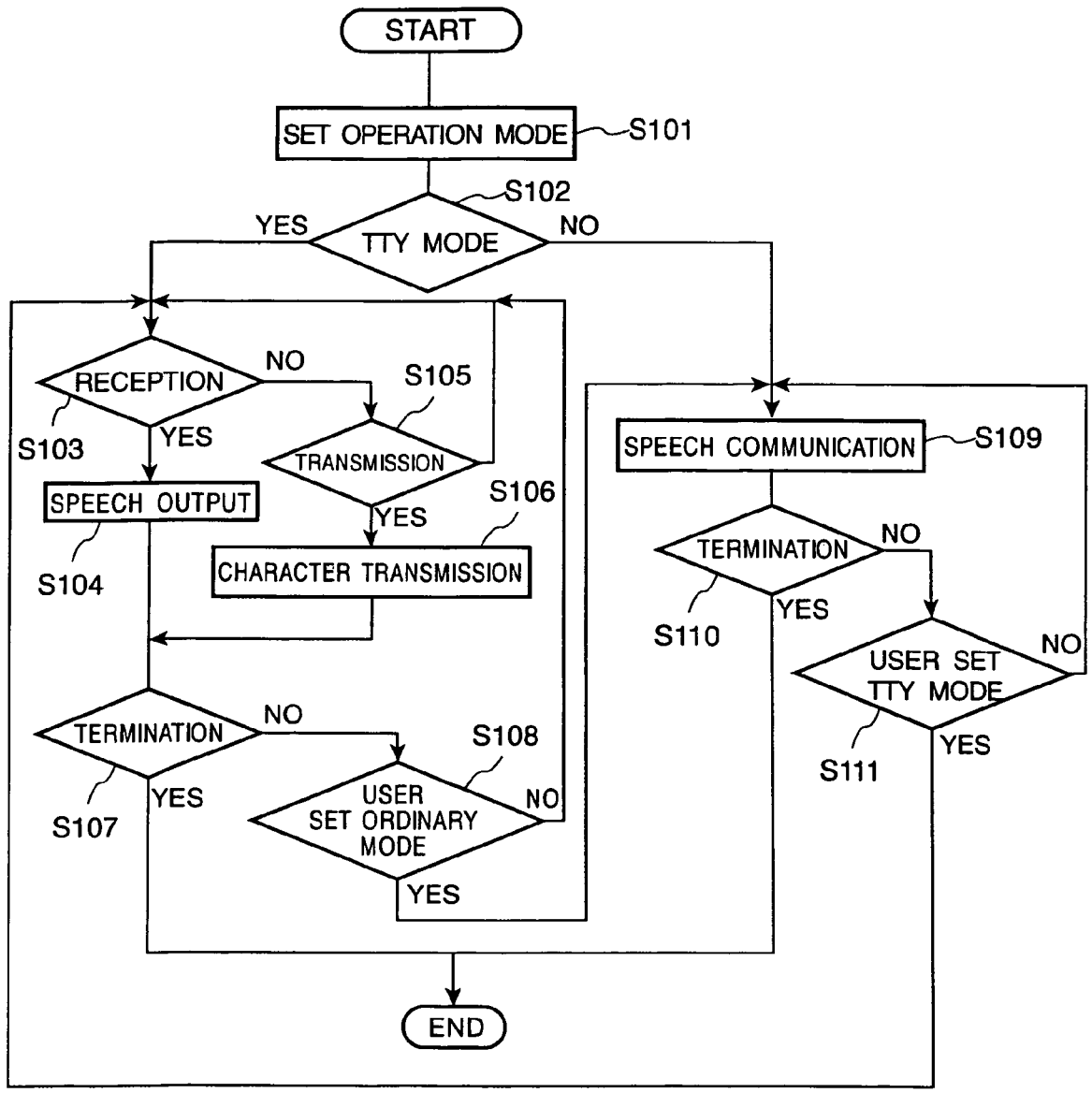
FIG. 9 is a flowchart showing another example of communication by the radio communication apparatus according to the second embodiment of the present invention.

In the flowchart shown in FIG. 8, an initial operation mode of the radio communication apparatus has been determined according to whether an identification number included in the incoming signals or input by the user is included in the ID table or not. The initial operation mode may alternatively be determined only according to an initial set of the operation mode as shown in FIG. 9. FIG. 9 is a flowchart showing another example of communication with the TTY telephone by the radio communication apparatus according to the second embodiment of the present invention.

The radio communication apparatus is in a stand-by status after a power switch has been switched on. During the stand-by status, the user sets up the operation mode, which is the TTY mode or the ordinary mode. Alternatively, an operation mode (the TTY mode or the ordinary mode) set up at the time of shipment or set up by the service company may be used (or set up) as the initial operation mode of the radio communication apparatus in case that the user does not set up the operation mode for himself or herself during the stand-by status (step S101).

The controller 63 determines whether the initial operation mode is the TTY mode or not (step S102). When the controller 63 has determined the TTY mode, the TTY mode communication will be made according to steps S103 to S108. The steps S103 to S108 are the same as the steps S88 to S93 shown in FIG. 8 and therefore explanations for the steps S103 to S108 are omitted herein. When the controller 63 is operating in the ordinary mode, the speech communication will be made according to steps S109 to S111. The steps S109 to S111 are the same as the steps S94 to S96 shown in FIG. 8 and therefore explanations for the steps S109 to S111 are omitted herein.

Third Embodiment

A third embodiment of the present invention will describe a radio communication apparatus which is also operative both to receive and display character signals transmitted from the TTY terminal and to input and transmit character signals to be transmitted to the TTY telephone through a base station provided in an area where the radio communication apparatus belongs in the CDMA cellular radio communication system. The character signals form character streams (or a character data set) which may represent message (or chat) texts, predetermined messages and/or the like. The character streams may be ASCII character streams.

Figure 10:
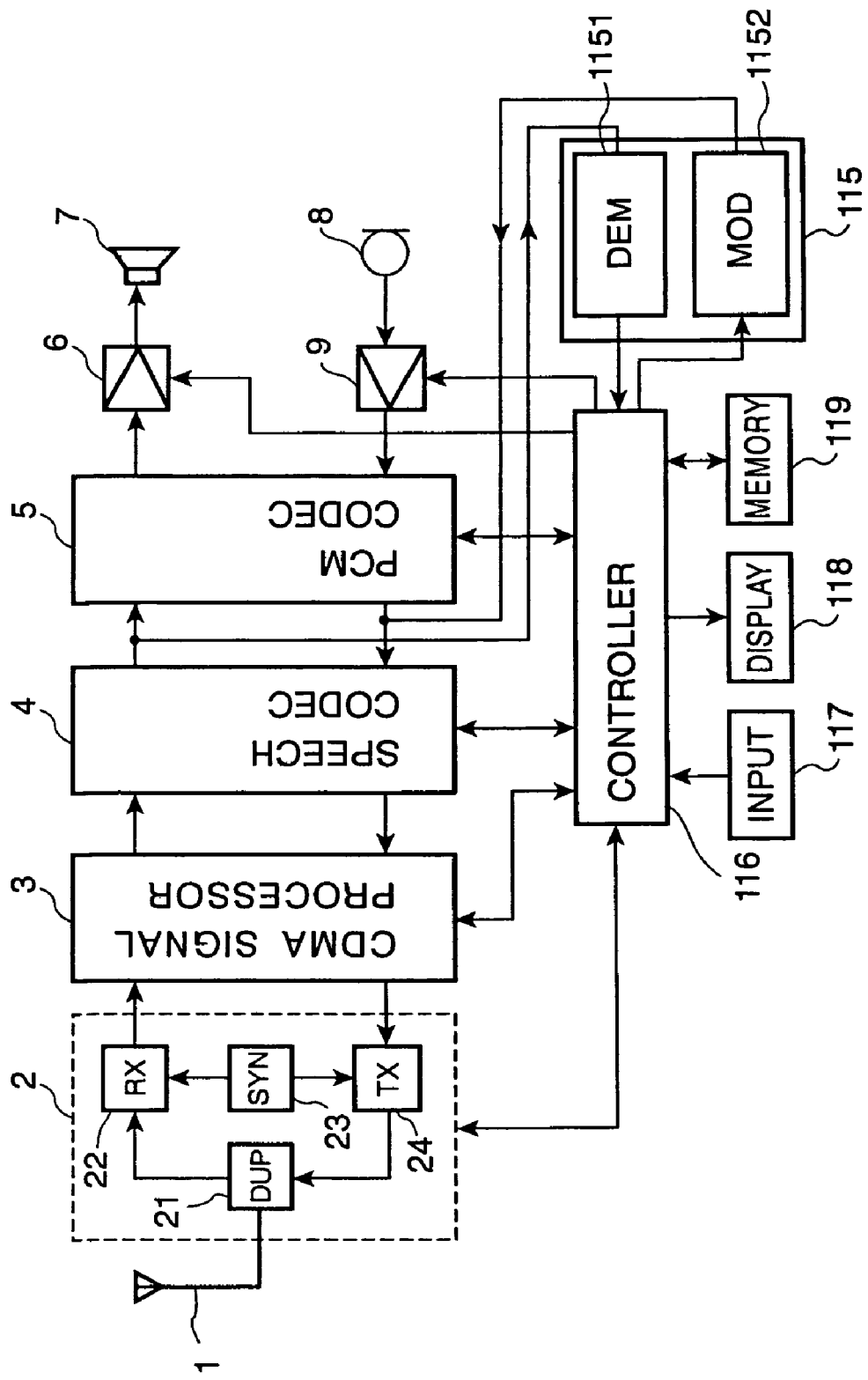
FIG. 10 is a block diagram showing a first exemplary configuration of the radio communication apparatus according to a third embodiment of the present invention.

FIG. 10 is a block diagram showing an exemplary configuration of the radio communication apparatus according to the third embodiment of the present invention. In FIG. 10, components, which are operative in a manner similar to the components shown in FIG. 1 are given the same reference numbers and are omitted detailed explanations.

In comparison with the first and second embodiments of the present invention, the radio communication apparatus includes a TTY modem 115, a controller 116, an input unit 117, a display 118, and a memory 119. The TTY modem 115 includes a TTY demodulator 1151 and a TTY modulator 1152. The radio communication apparatus including the above described components may be operated as follows.

When it is a speech communication between the user and a party holding the TTY telephone, operations of the radio communication apparatus are implemented as described in the first embodiment.

The character signals received by the antenna 1 are processed as audio signals (or speech signals) up to the speech codec 4 in a manner similar to the description for the first embodiment of the present invention. The speech codec 4 notifies the controller 116 that the character signals are input to the speech codec 4. Further, the character signals in a form of digital audio (speech) signals output from the speech codec 4 are provided to the TTY demodulator 1151 according to the third embodiment of the present invention. Under the above situation, although the character signals are provided to the PCM codec 5 and further on to the speaker 7 as described in the first embodiment, the user can only hear a signal sound representing the character signals. Since the sound does not make sense as a language, the controller 116 may render the reception amplifier 6 inoperative in response to the notice from the speech codec 4. Alternatively, the controller 116 may render a whole part or only a decoding part of the PCM codec 5 inoperative so that no signal is input to the reception amplifier 6. Rendering those inoperative may be accomplished by terminating a power supply to those or terminating clock signals for their operations, for example.

The TTY demodulator 1151 decodes and converts the character signals into character streams such as, for example, ASCII character streams as mentioned before. The character streams are provided to the controller 116.

The controller 116 controls each component of the radio communication apparatus and particularly executes analysis, determinations, and processing according to flowcharts shown in FIG. 14 or 15 which will be described later.

The display 118 may comprise a liquid crystal display (LCD) and displays various kinds of information. For example, a telephone number for a call origination is displayed in the display 118. A telephone number of the TTY telephone which has originated a call to the radio communication apparatus may also be displayed in the display 118. Further in the display 118, a battery level and a received signal strength indicator level may be displayed. When the character signals have been received, the character streams provided to the controller 116 from the TTY demodulator 1151 are sent to the display 118 and displayed as text messages in the display 118. On the other hand, when character streams have been input from the input unit 117, the character streams provided to the controller 116 from the input unit 117 are sent to the display 118 and displayed in the display 118 so that the user can recognize and confirm what he or she has input for transmission. The character streams input from the input unit 117 are transmitted substantially in real, time as similar to a typical TTY feature.

The memory 119 stores operation programs, such as to be executed in the controller 116, for operating the radio communication apparatus. The operation programs include programs for executing the determinations and processing according to flowcharts shown in FIG. 14 or 15 which will be described later. The memory also stores various kinds of conditions and information which have been set at the time of shipment, by the service company, and/or by the user. An ID table showing identification numbers of TTY telephones is stored as part of such information in the memory 119. The identification numbers are, for example, telephone numbers. The ID table may be similar to that shown in FIG. 4. Still further, the memory 119 may also store a log of the character streams (text messages) displayed in the display 118.

The input unit 117 includes numeral keys and several function keys including an on-hook key and an off-hook key. The user can input a telephone number for a call origination using the numeral keys. The telephone number is of the party's TTY telephone. The input unit 117 is also used for inputting characters which may construct character streams representing text messages. The input unit 117 may further have additional keys for the character input. Alternatively, conventional keys, such as numeral keys and function keys, may be used for the character input which may be operative in a different manner when the TTY mode is set up.

When it is a character communication between the user and the party, character streams, such as, for example, ASCII character streams as mentioned before, are generated in response to the user's input operation with the input unit 117 and are provided to the TTY modulator 1152 through the controller 116. The TTY modulator 1152 codes and converts the character streams into character signals. The character signals in a digital form are provided to the speech codec 4. The character signals provided to the speech codec 4 are processed as audio signals (or speech signals) up to the receiver 2 in a manner similar to the processing of the speech signals to be transmitted as described in the first embodiment of the present invention. Accordingly, the character signals converted to a predetermined radio frequency signals are transmitted from the antenna 1 to the base station over the radio link, and further on to the TTY telephone.

When the character signals are transmitted, the microphone 8, the transmission amplifier 9, and the PCM codec 5 are not used for the transmission. According to the third embodiment of the present invention, it may be a case that a holder of the TTY telephone is hard of hearing and speaking. This means that it is not preferable but rather useless to transmit speech signals. Therefore, the controller 116 may render the transmission amplifier 9 inoperative in response to the reception of the character streams from the input unit 117. Alternatively or in addition, the controller 116 may render a whole part or only a coding part of the PCM codec 5 inoperative so that no speech signal is input to the coding part of the speech codec 4. Rendering those inoperative may be accomplished by terminating a power supply to those or terminating clock signals for their operations, for example.

Figure 11:
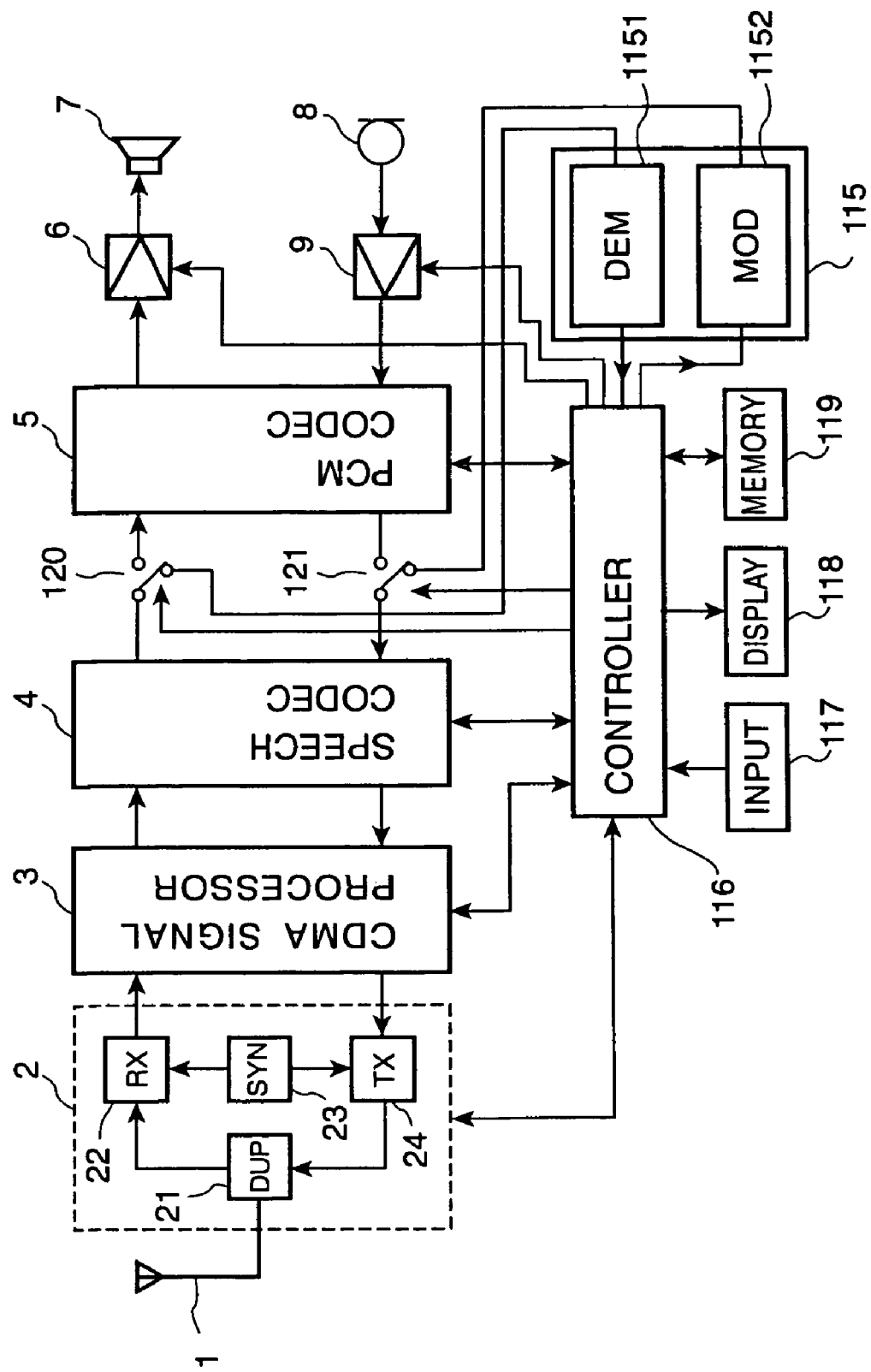
FIG. 11 is a block diagram showing a second exemplary configuration of the radio communication apparatus according to the third embodiment of the present invention.

FIG. 11 is a block diagram showing another exemplary configuration of the radio communication apparatus according to the third embodiment of the present invention. FIG. 11 shows still another example of avoiding character signals from outputting from the speaker 7 and also avoiding speech signals from inputting to the speech codec 4.

As shown in FIG. 11, a first switch 120 is provided between the speech codec 4 and the PCM codec 5 in a reception system of the radio communication apparatus. The first switch 120 is also connected to the TTY demodulator 1151. Further, a second switch 121 is provided between the speech codec 4 and the PCM codec, in a transmission system of the radio communication apparatus. The second switch 121 is also connected to the TTY modulator 1152. When it is a speech communication between the user and the party, the controller 116 controls the first switch 120 and the second switch 121 to connect the speech codec 4 to the PCM codec 5. On the other hand, when it is a character communication between the user and the party, the controller 116 controls the first switch 120 to connect the speech codec 4 to the TTY demodulator 1151 so as to avoid the character signals from outputting from the speaker 7. Also when it is a character communication between the user and the party, the controller 116 controls the second switch 121 to connect the speech codec 4 to the TTY modulator 1152 so as to avoid speech signals, if input from the microphone 8, from inputting to the speech codec 4.

When it is a character communication between the user and the party, since no signal is input to the PCM codec 5 and the reception amplifier 6 in reception and it is not necessary for the transmission amplifier 9 and the PCM codec 5 to be operative in transmission, the controller 116 may also render the PCM codec 5, the reception amplifier 6, and the transmission amplifier 9 inoperative as described above.

Figure 12:
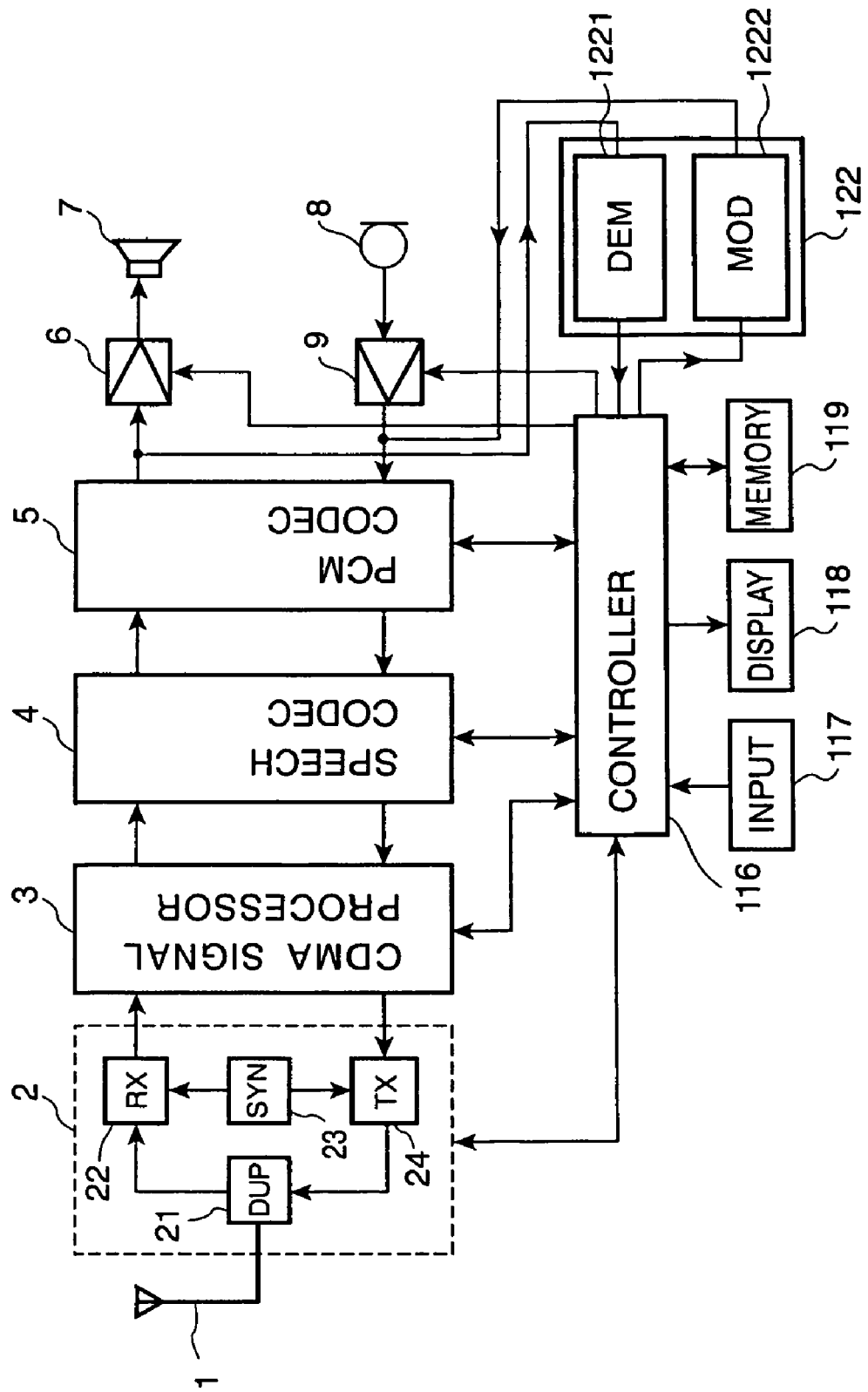
FIG. 12 is a block diagram showing a third exemplary configuration of the radio communication apparatus according to the third embodiment of the present invention.

The TTY modem 115 is connected to between the speech codec 4 and the PCM codec 5 in FIG. 11 and converts signals between digital and analog forms. However, a TTY modem may alternatively be connected to between the PCM codec 5 and the reception amplifier 6 and the transmission amplifier 9, and processes signals on an analog form as shown in FIG. 12. FIG. 12 is a block diagram showing still another exemplary configuration of the radio communication apparatus according to the third embodiment of the present invention.

As shown in FIG. 12, a TTY modem 122 is connected to between the PCM codec 5 and the reception amplifier 6 and the transmission amplifier 9. A TTY demodulator 1221 is connected to between the PCM codec 5 and the reception amplifier 6. Further, a TTY modulator 1222 is connected to between the PCM codec 5 and the transmission amplifier 9. When it is a character communication between the user and the party, the TTY demodulator 1221 decodes and converts character signals, decoded in the PCM codec 5 which is in a form of analog audio (speech) signals, into character streams, such as, for example, ASCII character streams as mentioned before. The character streams are provided to the controller 116 and displayed in the display 118 as described before.

Also when it is a character communication between the user and the party, character streams input from the input unit 117 are provided to the TTY modulator 1222 through the controller 116. The TTY modulator 1222 codes and converts the character streams into character signals. The character signals are provided to the PCM codec 5 and processed as analog audio (speech) signals.

Under the above configuration, although the character signals can be provided to the reception amplifier 6 and the speaker 7, the user can only hear a signal sound representing the character signals. Since the sound does not make sense as a language, the controller 116 may render the reception amplifier 6 inoperative in response to the notice from the speech codec 4. Similarly, since it is not necessary for the transmission amplifier 9 to be operative in character transmission, the controller 116 may also render the transmission amplifier 9 inoperative in response to the reception of the character streams from the input unit 117. Rendering the reception amplifier 6 and/or the transmission amplifier 9 inoperative may be accomplished by terminating a power supply to the reception amplifier 6 and/or the transmission amplifier 9 or terminating clock signals for their operations, for example.

Figure 13:
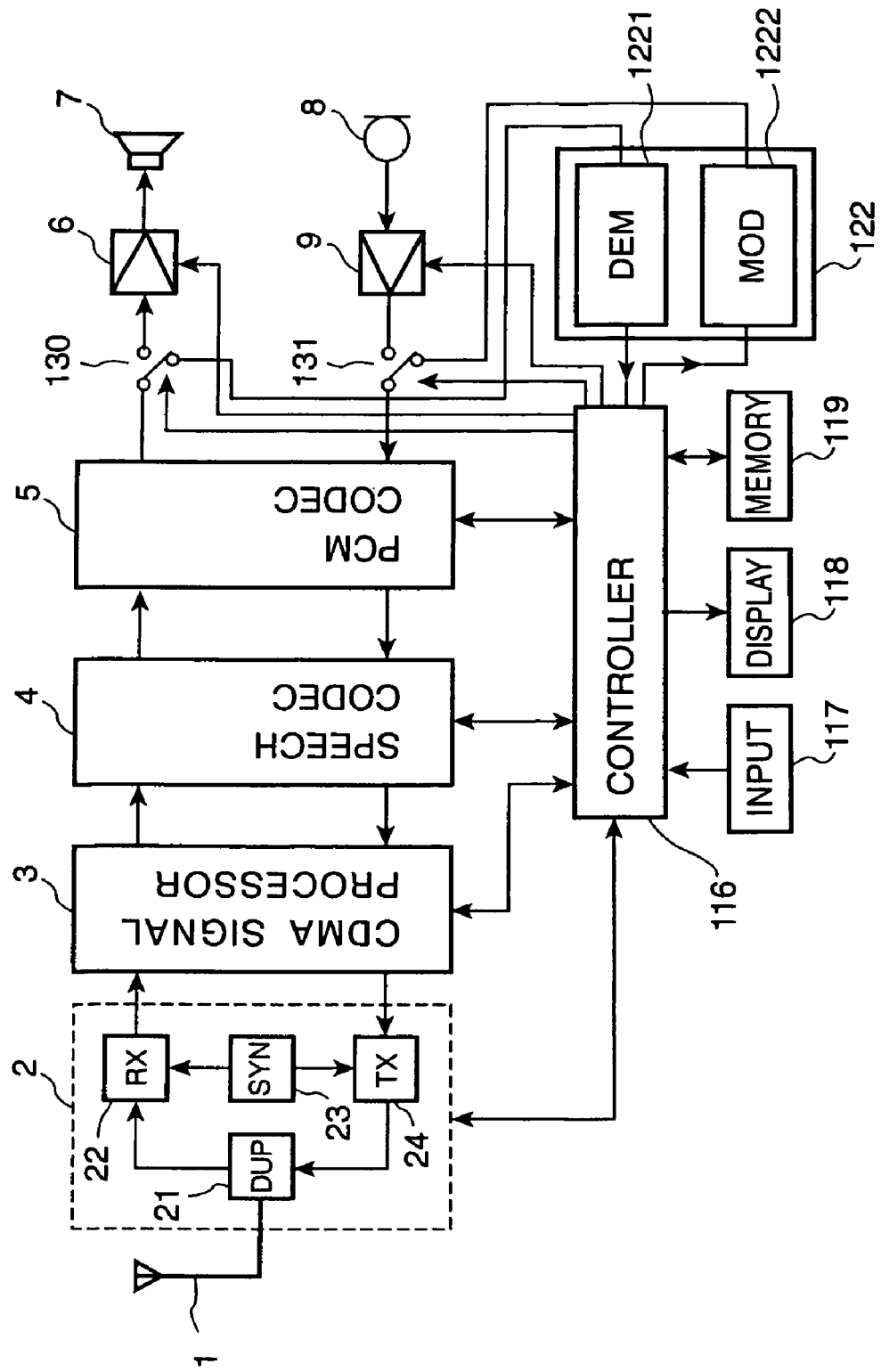
FIG. 13 is a block diagram showing a fourth exemplary configuration of the radio communication apparatus according to the third embodiment of the present invention.

Still another example of avoiding character signals from outputting from the speaker 7 and also avoiding speech signals from inputting to the PCM codec is shown in FIG. 13.

As shown in FIG. 13, a first switch 130 is provided between the PCM codec 5 and the reception amplifier 6 in a reception system of the radio communication apparatus. The first switch 130 is also connected to the TTY demodulator 1221. Further, a second switch 131 is provided between the PCM codec 5 and the transmission amplifier 9 in a transmission system of the radio communication apparatus. The second switch 131 is also connected to the TTY modulator 1222. When it is a speech communication between the user and the party, the controller 116 controls the first switch 130 to connect the PCM codec 5 to the reception amplifier 6 in the reception system and controls the second switch 131 to connect the PCM codec 5 to the transmission amplifier 9 in the transmission system. On the other hand, when it is a character communication between the user and the party, the controller 116 controls the first switch 130 to connect the PCM codec 5 to the TTY demodulator 1221 in the reception system so as to avoid the character signals from outputting from the speaker 7. Also when it is a character communication between the user and the party, the controller 116 controls the second switch 131 to connect the PCM codec 5 to the TTY modulator 1222 in the transmission system so as to avoid speech signals, if input from the microphone 8, from inputting to the PCM codec 5.

Since no signal is input to the reception amplifier 6 in reception and it is not necessary for the transmission amplifier 9 to be operative in transmission, the controller 116 may also render the reception amplifier 6 and the transmission amplifier 9 inoperative. Rendering the reception amplifier 6 and the transmission amplifier 9 inoperative may be accomplished by terminating a power supply to the reception amplifier 6 and the transmission amplifier 9 or terminating clock signals for their operations, for example.

A part of the configuration shown in FIG. 12 or 13 is also applied to the radio communication apparatus according to the first and second embodiments of the present invention. For example, in the first embodiment, analog signals output from the PCM codec 5, instead of the speech codec 4, may be provided to a TTY demodulator and also a switch may be provided between the PCM codec 5 and the reception amplifier 6. Similarly, for example, an output of a TTY modulator may be provided to the PCM codec 5, instead of the speech codec 4, and also a switch may be provided between the PCM codec 5 and the transmission amplifier 9 in the second embodiment.

Next, an operation of the radio communication apparatus according to the third embodiment of the present invention will be described with reference to FIG. 14. FIG. 14 is a flowchart showing an example of communication with the TTY telephone by the radio communication apparatus according to the third embodiment of the present invention. A holder of the TTY telephone (more generally called the party) is assumed to be hard of hearing and speaking. The TTY telephone may be as defined in the first embodiment. The TTY telephone may, however, alternatively be a radio communication incorporating the TTY feature described in the third embodiment of the present invention.

The radio communication apparatus according to the third embodiment of the present invention is in a stand-by status after a power switch has been switched on. During the stand-by status, the controller 116 determines whether incoming signals have been received from the TTY telephone or not (step S141). If the controller 116 determines that incoming signals have been received, the controller 116 further determines whether the incoming signals include an identification number, such as a telephone number, of the TTY telephone (step S142). If an identification number is included in the incoming signals, information of the identification number is provided to the controller 116 from the CDMA signal processor 3. If the incoming signals do not include any identification number, an ordinary mode is set up as an operation mode of the radio communication apparatus (step S143). When the controller 116 determines that the incoming signals include an identification number in step S142, the controller 116 refers to the ID table showing identification numbers of TTY holders stored in the memory 119 (step S144).

While incoming signals are not detected in step S141, the controller 116 also determines whether a call is originated by the user's input of an identification number and the off-hook operation (step S145). If no call is originated, the controller 116 repeats the determination of incoming signals detection and call origination. When the controller 116 determines that a call has been originated, the controller 116 also refers to the ID table stored in the memory 119 (step S144).

Next, the controller 116 determines whether the ID table includes the identification number included in the incoming signals or input by the user (step S146). If the identification number is not included in the ID table, the controller 116 determines to set the ordinary mode (step S143). In the ordinary mode, the radio communication apparatus communicates with the TTY telephone in speech. In this case, the TTY telephone may not be a telephone with the TTY feature or the TTY terminal. Operations in the ordinary mode will be described later. In step S146, when the controller 116 has determined that the identification number is included in the ID table stored in the memory 119, a TTY mode is set up as an operation mode of the radio communication apparatus (step S147).

In the TTY mode according to the third embodiment of the present invention, the radio communication apparatus communicates with the TTY telephone in character (step S148). In the character communication, when signals are received from the TTY telephone through the base station over the radio link, the received signals are displayed as text messages in the display 118. Since it is determined that the identification number is included in the ID table, the received signals are likely to be character signals. Therefore, the received signals are decoded and converted to character streams, such as ASCII character streams, and displayed in characters representing the text messages. The displayed text messages may be stored as a log of the communication in the memory 119.

While waiting for the signal reception, if the user inputs characters with the input unit 117, the character streams, such as ASCII character streams, representing the text messages, based on the character input operation are displayed in the display 118. The displayed character streams may be stored as a log of the communication in the memory 119. The input character streams are also coded and converted to character signals and transmitted as burst signals of a radio frequency to the base station over the radio link and further on to the TTY telephone.

During such a communication, the controller 116 determines whether the communication is terminated or not by the on-hook switch or maybe by a non-hook operation at the TTY telephone's end (step S149). While the communication is not terminated and continues, the controller 116 also determines whether the operation mode is changed to the ordinary mode in response to the user's input operation with the input unit 117 or not (step S150). If the user changes the operation mode for himself or herself, a speech communication will be enabled (step S151).

Turning now to the ordinary mode (also called the ordinary state of the operation mode), the radio communication apparatus carries out a speech communication with the TTY telephone. In other words the user talks to the microphone 8 and hears a voice from the speaker 7 (step S151). During such a speech communication, the controller 116 determines whether the communication is terminated or not by the on-hook switch or maybe by an on-hook operation at the TTY telephones end (step S152). While the communication is not terminated and continues, the controller 116 also determines whether the operation mode is changed to the TTY mode in response to the user's input operation with the input unit 117 or not (step S153). If the user changes the operation mode for himself or herself, the TTY mode communication will be enabled (step S148).

During the communication in the TTY mode or the ordinary mode, when the controller 116 has recognized the on-hook switch operation or the termination at the TTY telephone's end (step S149 or S152), the communication is terminated.

Figure 14:
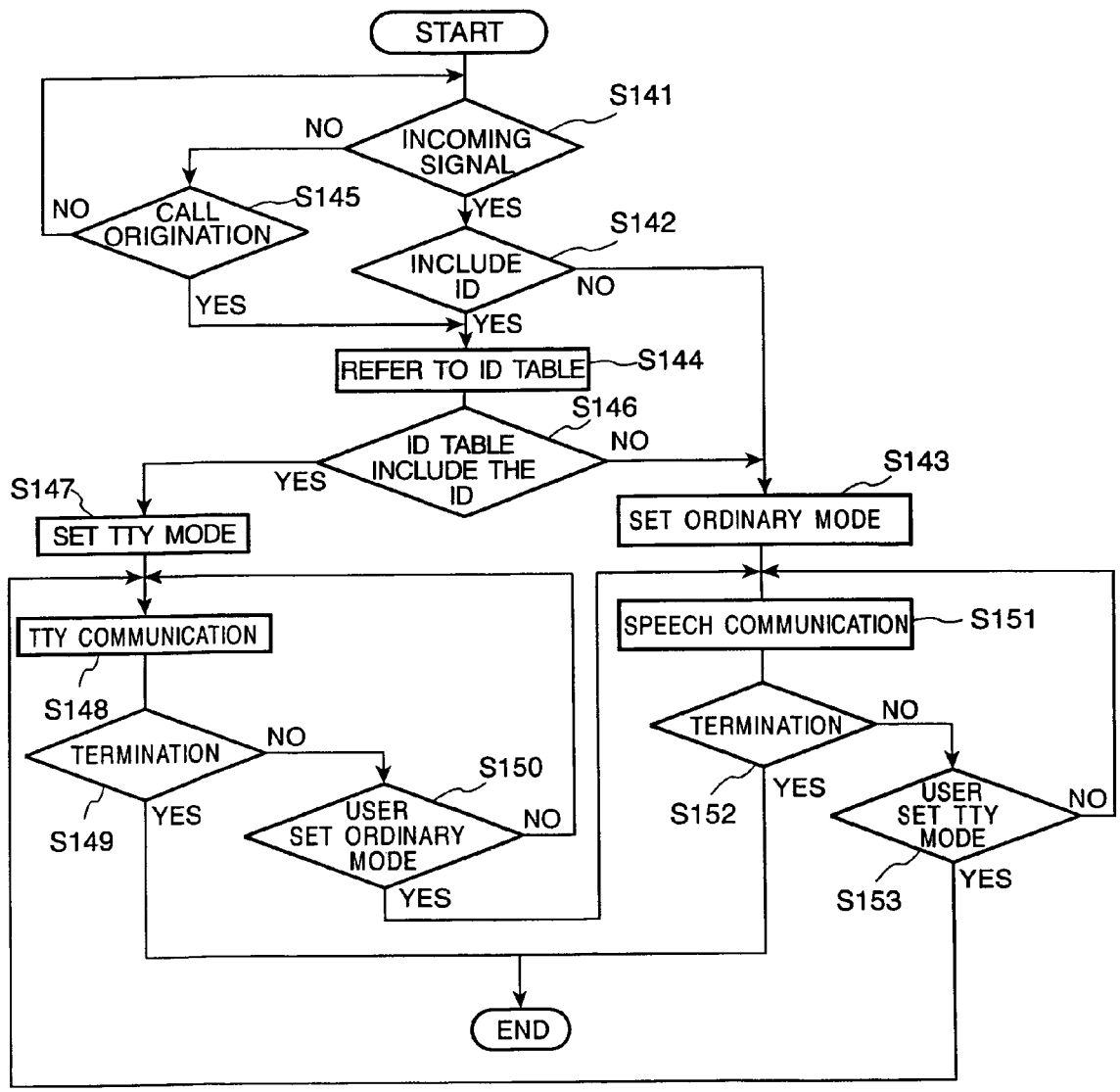
FIG. 14 is a flowchart showing an example of communication by the radio communication apparatus according to the third embodiment of the present invention.
Figure 15:
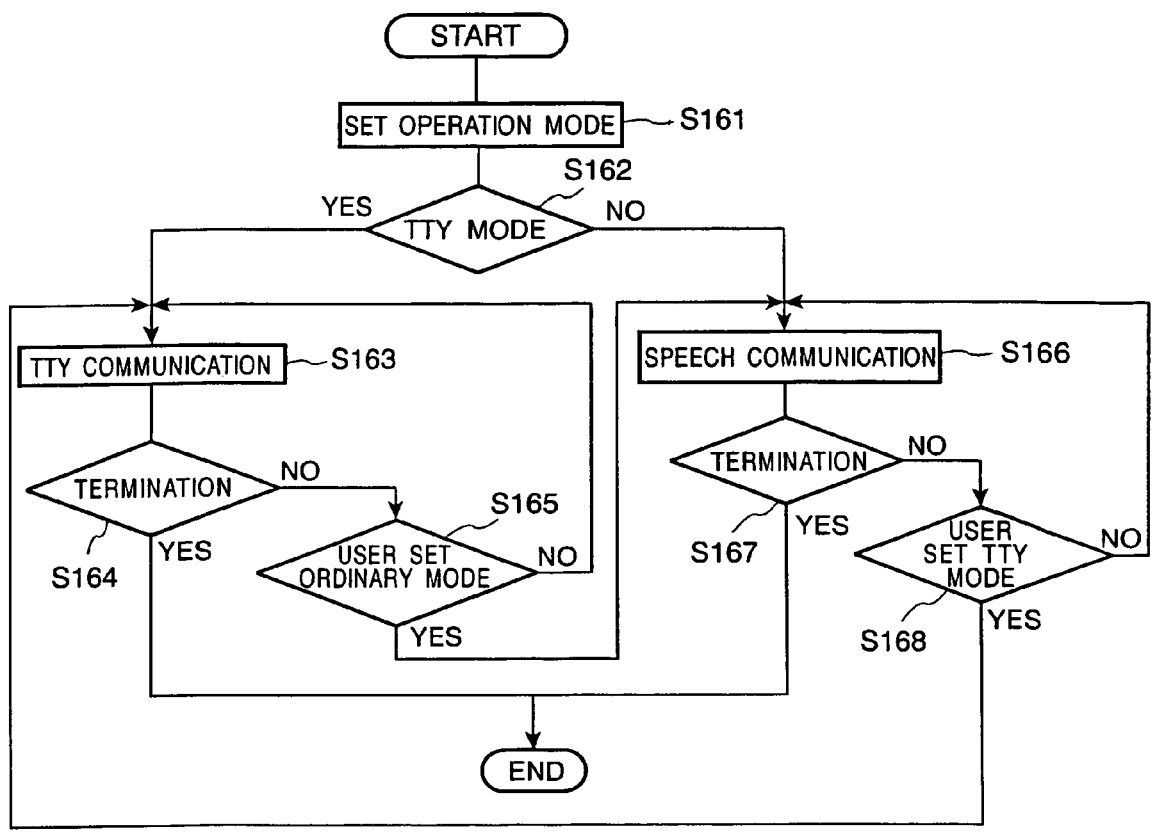
FIG. 15 is a flowchart showing another example of communication by the radio communication apparatus according to the third embodiment of the present invention.

In the flowchart shown in FIG. 14, an initial operation mode of the radio communication apparatus has been determined according to whether an identification number included in the incoming signals or input by the user is included in the ID table or not. The initial operation mode may alternatively be determined only according to an initial set of the operation mode as shown in FIG. 15. FIG. 15 is a flowchart showing another example of communication with the TTY telephone by the radio communication apparatus according to the third embodiment of the present invention.

The radio communication apparatus is in a stand-by status after a power switch has been switched on. During the stand-by status, the user sets up the operation mode, which is the TTY mode or the ordinary mode. Alternatively, a state or an operation mode (the TTY mode or the ordinary mode) set up at the time of shipment or set up by the service company may be used (or set up) as the initial operation mode of the radio communication apparatus in case that the user does not set up the operation mode for himself or herself during the stand-by status (step S161).

The controller 116 determines whether the initial operation mode is the TTY mode or not (step S162). When the controller 116 has determined it is the TTY mode, the TTY mode communication will be made according to steps S163 to S165. The steps S163 to S165 are the same as the steps S148 to S150 shown in FIG. 14 and therefore explanations for the steps S163 to S165 are omitted herein. When the controller 116 has determined it is the ordinary mode, the speech communication will be made according to steps S166 to S168. The steps S166 to S168 are the same as the steps S151 to S153 shown in FIG. 14 and therefore explanations for the steps S166 to S168 are omitted herein.

Fourth Embodiment

The radio communication apparatus according to the first to the third embodiments of the present invention is operative either in the TTY mode or the ordinary mode. A radio communication apparatus according to embodiments of the present invention is not limited to such a use but may also be operative in a plurality of TTY modes as well as the ordinary mode.

FIG. 16 is an illustration showing an example of an ID table according to a fourth embodiment of the present invention. The ID table in FIG. 16 shows that identification numbers g to l are registered as TTY terminal holders. In this example, there are three types of TTY modes, TTY1 to TTY3. In detail, the radio communication apparatus may communicate with a TTY telephone assigned the identification number g or j in the TTY mode TTY1. In addition, the radio communication apparatus may communicate with a TTY telephone assigned the identification number k in the TTY mode TTY2. Further, the radio communication apparatus may communicate with a TTY telephone assigned the identification number h, i, or l in the TTY mode TTY3.

Here, in the TTY mode TTY1, the radio communication apparatus is capable of receiving and displaying character signals transmitted from the TTY telephone but is not equipped with a function of inputting and transmitting character signals as a TTY. In the TTY mode TTY2, the radio communication apparatus is capable of inputting and transmitting character signals to the TTY telephone but is not equipped with a function of receiving and displaying character signals as a TTY. However, in, the TTY mode TTY3, the radio communication apparatus its capable of receiving and displaying character signals transmitted from the TTY telephone and also capable of inputting and transmitting character signals as a TTY. The identification numbers and corresponding operation modes may be added to and/or deleted from the ID table by the user, for example, using the input unit 117. Alternatively, they may automatically be registered when a new identification number is included with an operation mode in incoming signals.

Next, an operation of the radio communication apparatus according to a fourth embodiment of the present invention will be described with reference to FIGS. 17A to 17E. FIGS. 17A to 17E are flowcharts showing an example of communication with the TTY telephone by the radio communication apparatus according to the fourth embodiment of the present invention.

In the TTY mode TTY1, a holder of the TTY telephone is assumed to be able to hear but cannot or has limited speaking capabilities (i.e., hard of speaking). In the TTY mode TTY2, a holder of the TTY telephone is assumed to be able to speak but hard of hearing. Further, in the TTY mode TTY3, a holder of the TTY telephone is assumed to be hard of speaking and hearing. The TTY telephone may be as defined in the first embodiment. The TTY telephone may, however, alternatively be a radio communication incorporating the TTY feature described in the first, the second, or the third embodiment of the present invention as appropriately. The radio communication according to the fourth embodiment may be configured as shown in one of FIGS. 10 to 13. In the following description, the radio communication apparatus shown in FIG. 10 will be taken as an example.

The radio communication apparatus according to the fourth embodiment of the present invention is in a stand-by status after a power switch has been switched on. During the stand-by status, the controller 116 determines whether incoming signals have been received from the TTY telephone or not (step S1701). If the controller 116 determines that incoming signals have been received, the controller 116 further determines whether the incoming signals include an identification number, such as a telephone number, of the TTY telephone (step S1702). If the incoming signals do not include any identification number, the controller 116 sets up the ordinary mode as the operation mode of the radio communication apparatus (step S1703). Operations in the ordinary mode will be described with reference to FIG. 17E. Alternatively, however, before setting up the ordinary mode, the flow may follow operations in FIG. 18. On the other hand, if an identification number is included in the incoming signals, information of the identification number is provided to the controller 116 from the CDMA signal processor 3. The controller 116 refers to the ID table which is stored in the memory 119 (step S1704).

While incoming signals are not detected in step S1701, the controller 116 also determines whether a call is originated by the user's input of an identification number and the off-hook operation (step S1705). If no call is originated, the controller 116 repeats the determination of incoming signals detection and call origination. When the controller 116 determines that a call has been originated, the controller 116 also refers to the ID table stored in the memory 119 (step S1704).

Next, the controller 116 determines whether the ID table includes the identification number included in the incoming signals or input by the user (step S1706). If the identification number is not included in the ID table, the controller 116 sets up the ordinary mode as the operation mode of the radio communication apparatus (step S1707). Operations in the ordinary mode will be described with reference to FIG. 17E. Alternatively, however, before setting up the ordinary mode, the flow may follow operations in FIG. 18. In step S1706, when the controller 116 has determined that the identification number is included in the ID table stored in the memory 119, the controller 116 determines a TTY mode corresponding to the identification number included in the incoming signals or input by the user among the TTY modes TTY1, TTY2, and TTY3 (step S1708).

If the controller 116 has determined that it is the TTY mode TTY1 (step S1709), the controller 116 sets up the TTY mode TTY1 as the operation mode of the radio communication apparatus (step S1710). Operations in the TTY mode TTY1 will be described with reference to FIG. 17B. If the controller 116 has determined that it is the TTY mode TTY2 (step S1711), the controller 116 sets up the TTY mode TTY2 as the operation mode of the radio communication apparatus (step S1712). Operations in the TTY mode TTY2 will be described with reference to FIG. 17C. If the controller 116 has determined that it is the TTY mode TTY3, the controller 116 sets up the TTY mode TTY3 as the operation mode of the radio communication apparatus (step S1713). Operations in the TTY mode TTY3 will be described with reference to FIG. 17D.

Figure 17A:
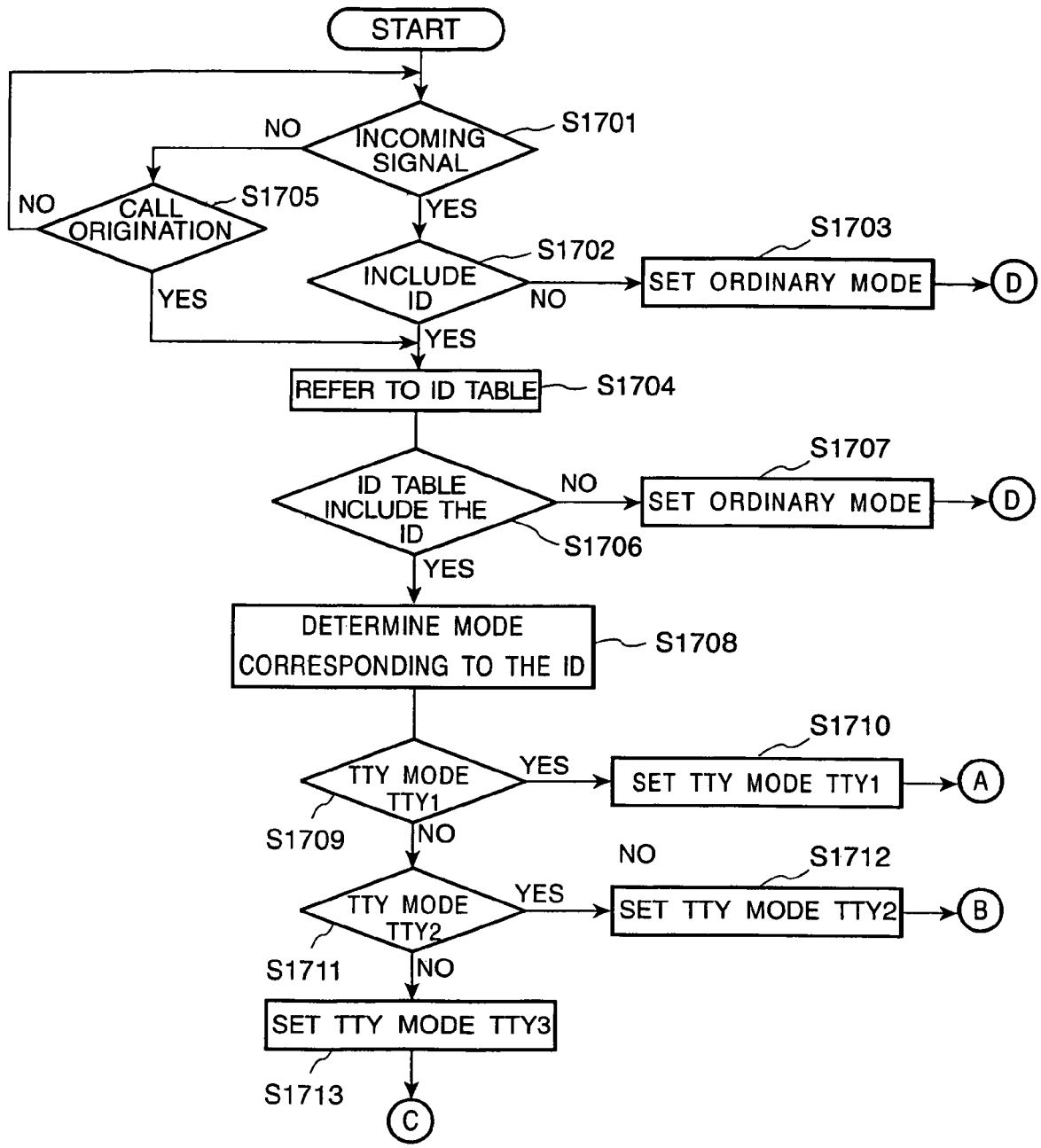
FIG. 17A is a flowchart showing an example of communication by the radio communication apparatus according to the fourth embodiment of the present invention.
Figure 17B:
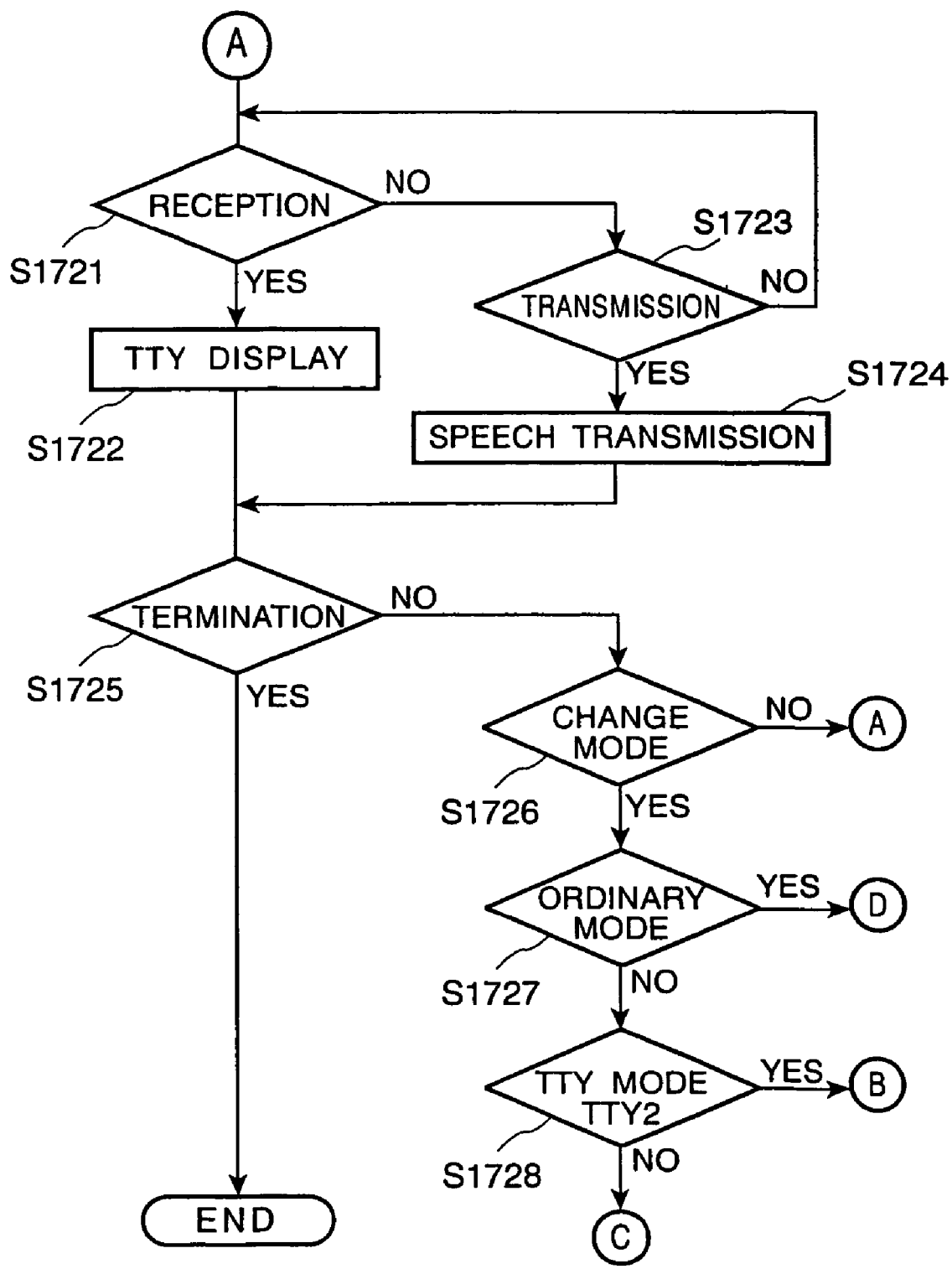
FIG. 17B is a flowchart showing an example of a first sub-flow of the flowchart shown in FIG. 17A/FIG. 18 according to the fourth embodiment of the present invention.

When the TTY mode TTY1 has been determined as the operation mode, operations of the radio communication apparatus are as follows as shown in FIG. 17B.

When signals are received from the TTY telephone through the base station over the radio link (step S1721), the received signals are displayed as text messages in the display 118 (step S1722). The displayed text messages may be stored as a log of the communication in the memory 119. Since it is determined that the identification number is included in the ID table, the received signals are likely to be character signals. Therefore, the received signals are decoded and converted to character streams, such as ASCII character streams, and displayed in characters representing the text messages.

While waiting for the signal reception, if the user talks to the microphone 8 (step S1723), speech signals based on the talks are modulated and transmitted as burst signals of a radio frequency (step S1724). During such a communication, the controller 116 determines whether the communication is terminated or not by the on-hook switch or maybe by an on-hook operation at the TTY telephone's end (step S1725). While the communication is not terminated and continues, the controller 116 also determines whether the operation mode is changed to other modes in response to the user's input operation with the input unit 117 or not (step S1726). If the operation mode is not changed, the flow goes back to step S1721. When the controller 116 has determined that the operation mode is changed, if it is the ordinary mode (step S1727), the flow goes to steps in FIG. 17E. Operations in the ordinary mode will be described with reference to FIG. 17E. If the changed operation mode is the TTY mode TTY2 (step S1728), the flow goes to steps in FIG. 17C. Operations in the TTY mode TTY2 will be described with reference to FIG. 17C. Further, if the changed mode is the TTY mode TTY3, the flow goes to steps in FIG. 17D. Operations in the TTY mode TTY3 will be described with reference to FIG. 17D.

During the communication in the TTY mode TTY1, when the controller 116 has recognized the on-hook switch operation or the termination at the TTY telephone's end (step S1725), the communication is terminated.

Figure 17C:
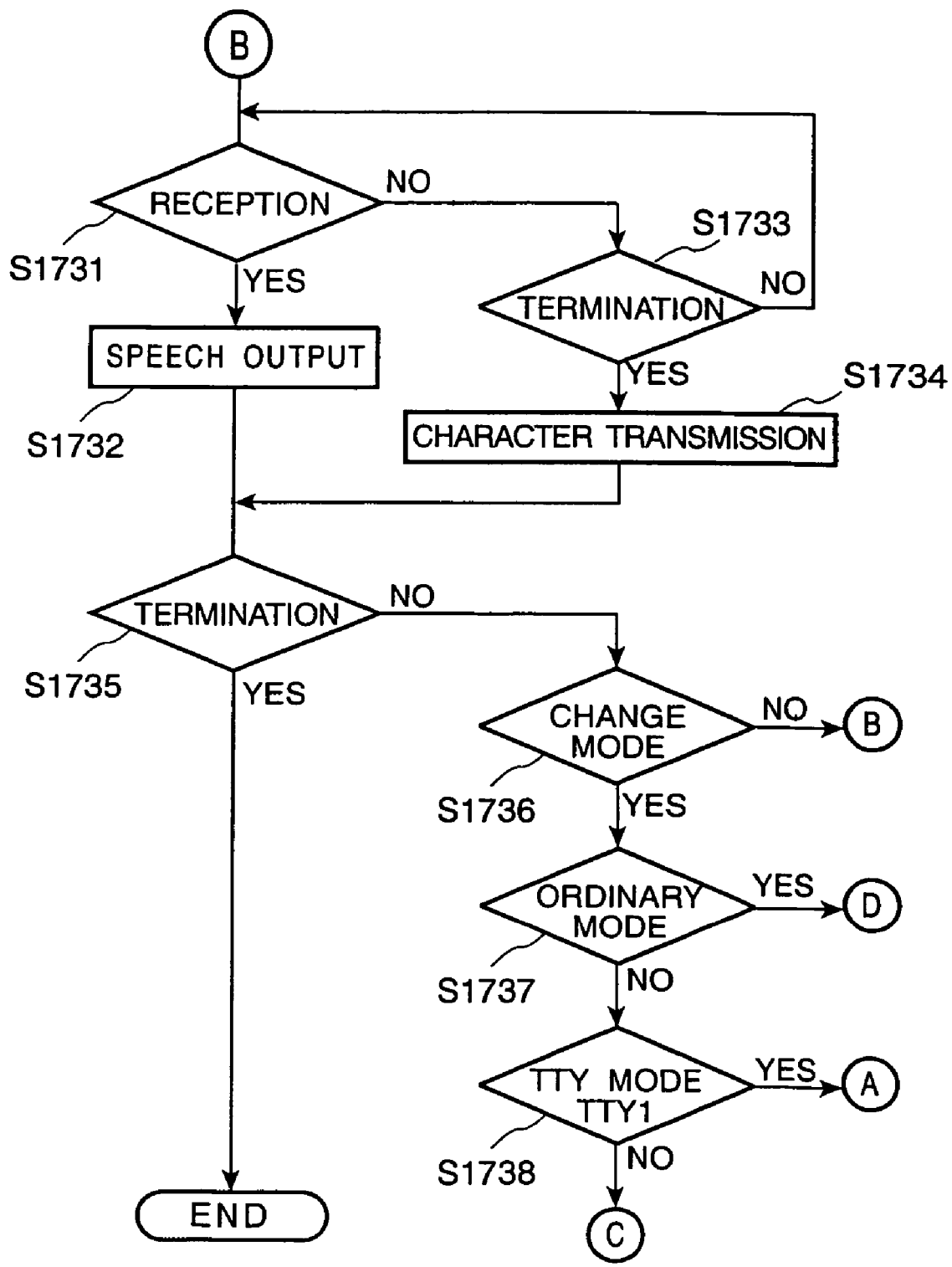
FIG. 17C is a flowchart showing an example of a second sub-flow of the flow chart shown in FIG. 17A/FIG. 18 according to the fourth embodiment of the present invention.

In FIG. 17A, when the TTY mode TTY2 has been determined as the operation mode operations of the radio communication apparatus are as follows as shown in FIG. 17C.

When signals are received from the TTY telephone through the base station over the radio link (step S1731), the received signals are output from the speaker 7 as voice messages as described in FIG. 1 (step S1732).

While waiting for the signal reception, if the user inputs characters with the input unit 117 (step S1733), character streams based on the character input operation are displayed in the display 118. The character streams are modulated to character signals and transmitted as burst signals of a radio frequency (step S1734). The displayed character streams may be stored as a log of the communication in the memory 119. Since it is determined that the identification number is included in the ID table, the TTY telephone is likely to have a TTY terminal or a TTY feature. Therefore, the character streams, such as ASCII character streams, representing the text messages are coded and converted to character signals, and transmitted to the base station over the radio link and further on to the TTY telephone.

During such a communication, the controller 116 determines whether the communication is terminated or not by the on-hook switch or maybe by a non-hook operation at the TTY telephone's end (step S1735). While the communication is not terminated and continues, the controller 116 also determines whether the operation mode is changed to other states or operation modes in response to the user's input operation with the input unit 117 or not (step S1736). If the operation mode is not changed, the flow goes back to step S1731. When the controller 116 has determined that the operation mode is changed, if it is the ordinary mode (step S1737), the flow goes to steps in FIG. 17E. Operations in the ordinary mode will be described with reference to FIG. 17E. If the changed operation mode is the TTY mode TTY1 step S1738) the flow goes to steps in FIG. 17B. Operations in the TTY mode TTY1 have been described with reference to FIG. 17B. Further, if the changed mode is the TTY mode TTY3, the flow goes to steps in FIG. 17D. Operations in the TTY mode TTY3 will be described with reference to FIG. 17D.

During the communication in the TTY mode TTY2, when the controller 116 has recognized the on-hook switch operation or the termination at the TTY telephone's end (step S1735), the communication is terminated.

Figure 17D:
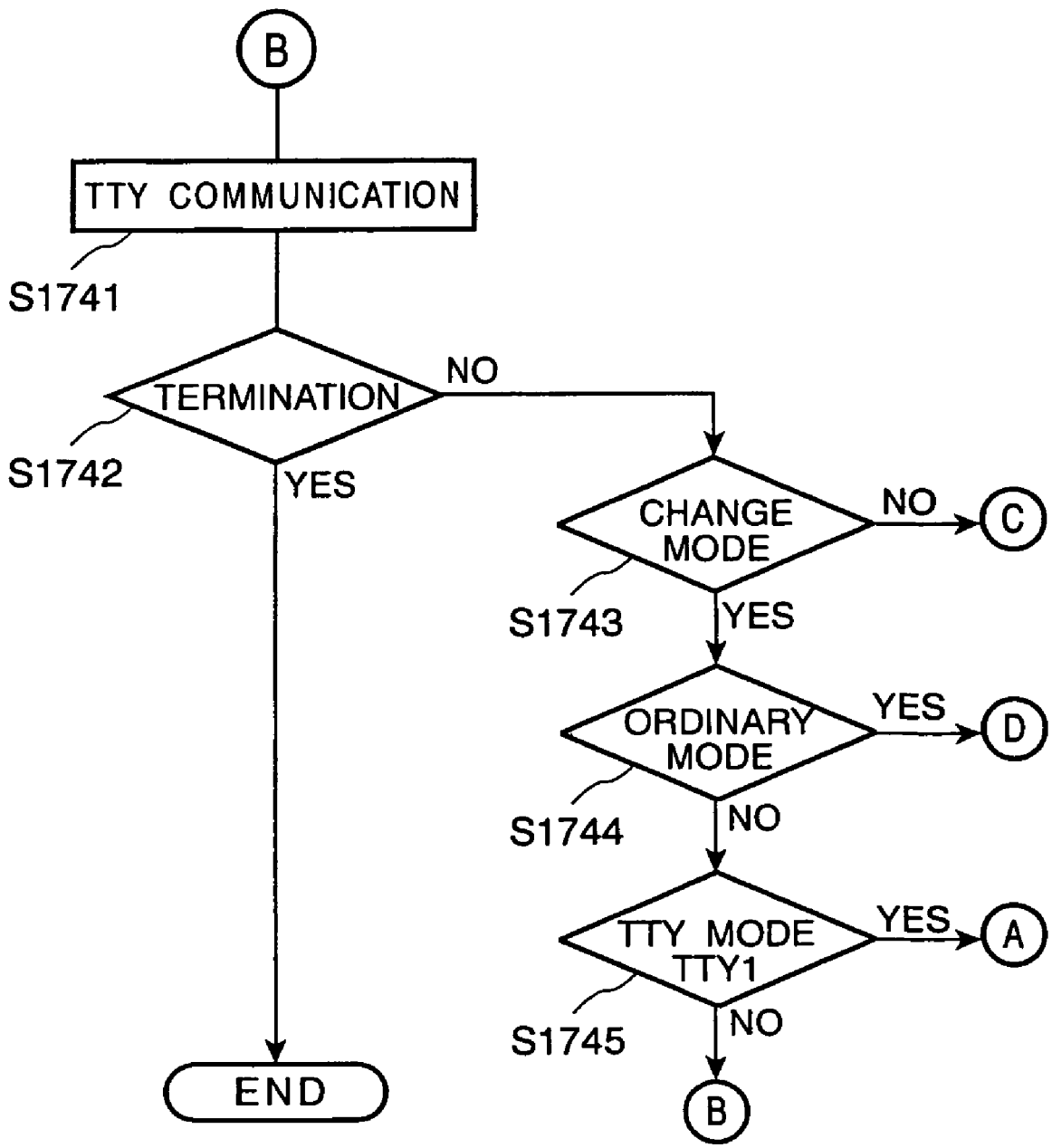
FIG. 17D is a flowchart showing an example of a third sub-flow of the flowchart shown in FIG. 17A/FIG. 18 according to the fourth embodiment of the present invention.

In FIG. 17A, when the TTY mode TTY3 has been determined as the operation mode, operations of the radio communication apparatus are as follows as shown in FIG. 17D.

In the TTY mode TTY3, the radio communication apparatus communicates with the TTY telephone using characters (step S1741). In the character communication, when signals are received from the TTY telephone through the base station over the radio link, the received signals are displayed as text messages in the display 118. Since it is determined that the identification number is included in the ID table, the received signals are likely to be character signals. Therefore, the received signals are decoded and converted to character streams, such as ASCII character streams, and displayed in characters representing the text messages. The displayed text messages may be stored as a log of the communication in the memory 119.

While waiting for the signal reception, if the user inputs characters with the input unit 117, the character streams, such as ASCII character streams, representing the text messages, based on the character input operation are displayed in the display 118. The displayed character streams may be stored as a log of the communication in the memory 119. The input character streams are also coded and converted to character signals, and transmitted as burst signals of a radio frequency to the base station over the radio link and further on to the TTY telephone.

During such a communication, the controller 116 determines whether the communication is terminated or not by the on-hook switch or maybe by an on-hook operation at the TTY telephone's end (step S1742). While the communication is not terminated and continues, the controller 116 also determines whether the operation mode is changed to other modes in response to the user's input operation with the input unit 117 or not (step S1743). If the operation mode is not changed, the flow goes back to step S1741. When the controller 116 has determined that the operation mode is changed, if it is the ordinary mode (step S1744), the flow goes to steps in FIG. 17E. Operations in the ordinary mode will be described with reference to FIG. 17E. If the changed operation mode is the TTY mode TTY1 (step S1745), the flow goes to steps in FIG. 17B. Operations in the TTY mode TTY1 have been described with reference to FIG. 17B. Further, if the changed mode is the TTY mode TTY2, the flow goes to steps in FIG. 17C. Operations in the TTY mode TTY2 have been described with reference to FIG. 17C.

During the communication in the TTY mode TTY3, when the controller 116 has recognized the on-hook switch operation or the termination at the TTY telephone's end (step S1742), the communication is terminated.

Figure 17E:
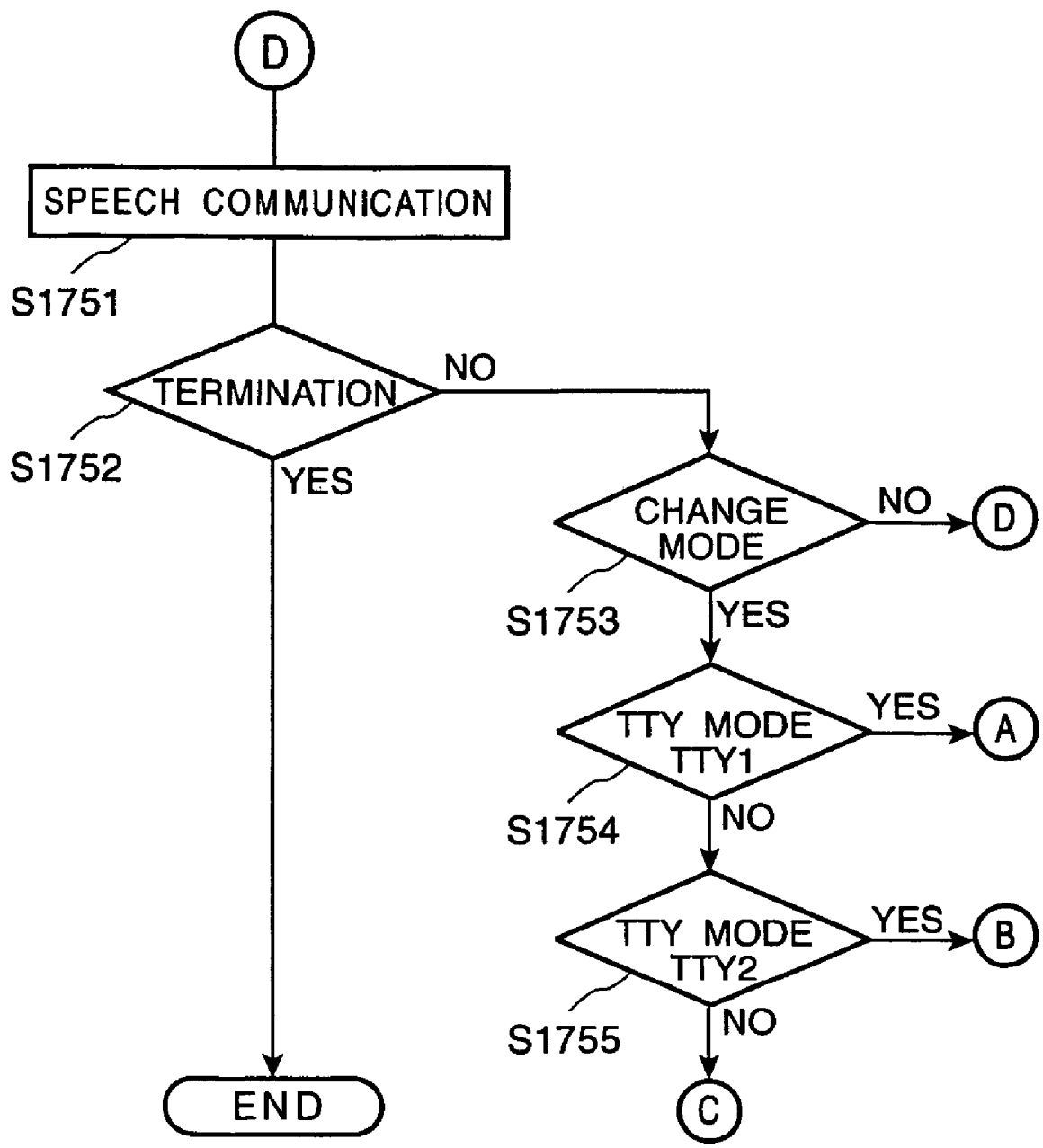
FIG. 17E is a flowchart showing an example of a fourth sub-flow of the flowchart shown in FIG. 17A/FIG. 18 according to the fourth embodiment of the present invention.

In FIG. 17A, when the ordinary mode has been determined as the operation mode, operations of the radio communication apparatus are as follows as shown in FIG. 17E.

In the ordinary mode, the radio communication apparatus carries out a speech communication with the TTY telephone. In other words, the user talks to the microphone 8 and hears a voice from the speaker 7 (step S1751). During such a speech communication, the controller 116 determines whether the communication is terminated or not by the on-hook switch or maybe by an on-hook operation at the TTY telephone's end (step S1752). While the communication is not terminated and continues, the controller 116 also determines whether the operation mode is changed to other modes in response to the user's input operation with the input unit 117 or not (step S1753). If the operation mode is not changed, the flow goes back to step S1751. When the controller 116 has determined that the operation mode is changed, if it is the TTY mode TTY1 (step S1754), the flow goes to steps in FIG. 17B. Operations in the TTY mode TTY1 have been described with reference to FIG. 17B. If the changed operation mode is the TTY mode TTY2 (step S1755), the flow goes to steps in FIG. 17C. Operations in the TTY mode TTY2 have been described with reference to FIG. 17C. Further, if the changed mode is the TTY mode TTY3, the flow goes to steps in FIG. 17D. Operations in the TTY mode TTY3 have been described with reference to FIG. 17D.

During the communication in the ordinary mode, when the controller 116 has recognized the on-hook switch operation or the termination at the TTY telephone's end (step S1752), the communication is terminated.

Figure 18:
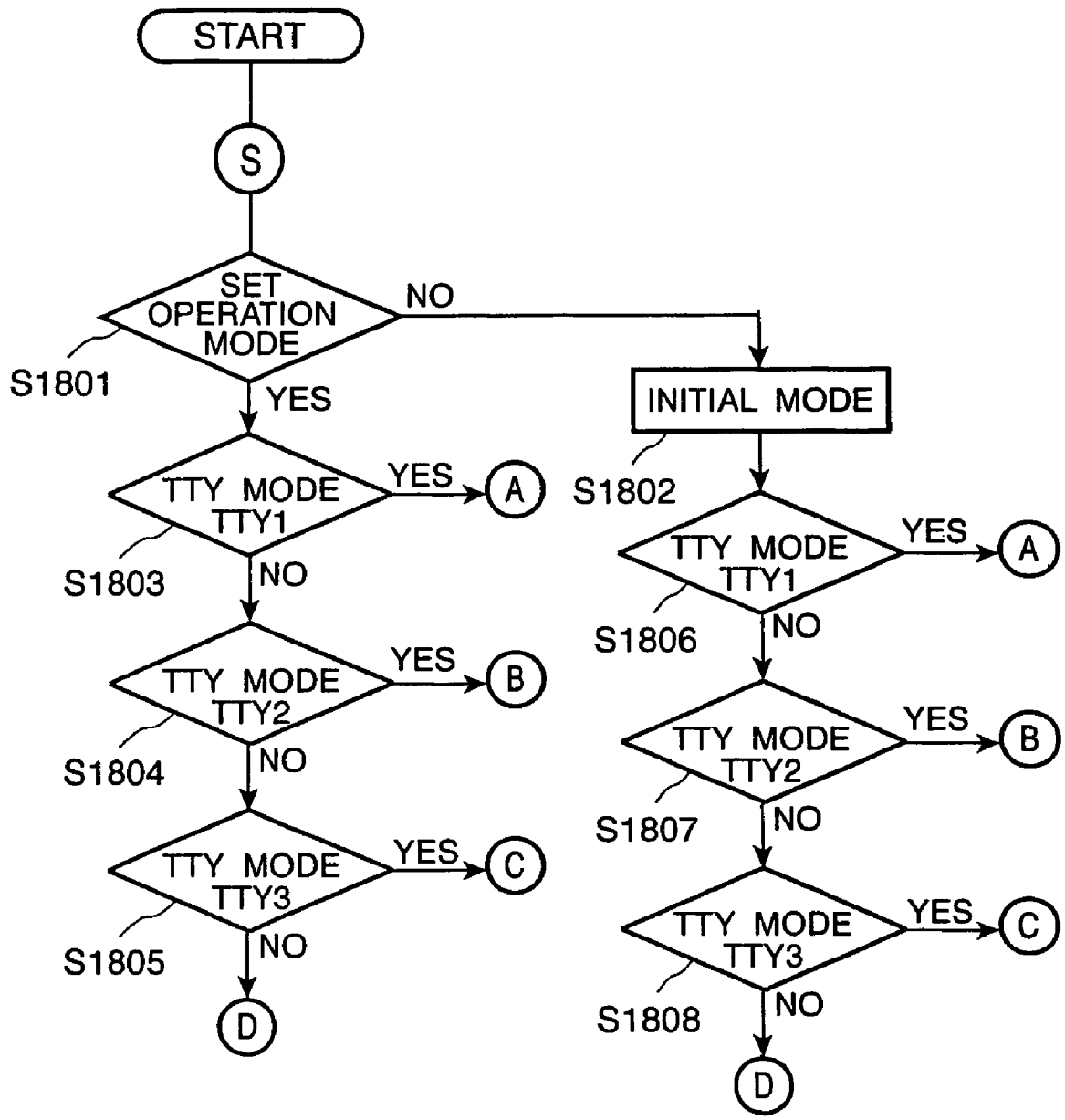
FIG. 18 is a flowchart showing another example, of communication by the radio communication apparatus according to the fourth embodiment of the present invention.

In the flowchart shown in FIG. 17A, an initial operation mode of the radio communication apparatus has been determined according to whether an identification number is included in the ID table or not. The initial operation mode may alternatively be determined only according to an initial set of the operation mode as shown in FIG. 18. FIG. 18 is a flowchart showing another example of communication with the TTY telephone by the radio communication apparatus according to the fourth embodiment of the present invention.

The radio communication apparatus is in a stand-by status after a power switch has been switched on. During the stand-by status, the user sets up the operation mode, which is the TTY mode TTY1, TTY2, TTY3, or the ordinary mode (step S1801). If the user does not set up the operation mode, an operation mode set up at the time of shipment or set up by the service company is used (or set up) as the initial operation mode of the radio communication apparatus (step S1802).

When the user sets up one of the operation modes, the controller 116 determines whether the initial operation mode is the TTY mode TTY1 or not (step S1803). When the controller 116 has determined that the operation mode is the TTY mode TTY1, the flow goes to steps in FIG. 17B.

When the controller 116 has determined that the operation mode is the TTY mode TTY2 (step S1804), the flow goes to steps in FIG. 17C. When the controller 116 has determined that the operation mode is the TTY mode TTY3 (step S1805), the flow goes to steps in FIG. 17D. If the controller 116 has not determined the TTY mode TTY3 but the ordinary mode in step S1805, the flow goes to steps in FIG. 17E.

Similarly, when the user has not set up the operation mode and an operation mode set up at the time of shipment or set up by the service company has been set as the initial operation mode in step S1802, the controller 116 determines whether the initial operation mode is the TTY mode TTY1 (step S1806). When the controller 116 has determined that the operation mode is the TTY mode TTY1, the flow goes to steps in FIG. 17B.

When the controller 116 has determined that the operation mode is the TTY mode TTY2 (step S1807), the flow goes to steps in FIG. 17C. When the controller 116 has determined that the operation mode is the TTY mode TTY3 (step S1808), the flow goes to steps in FIG. 17D. If the controller 116 has not determined the TTY mode TTY3 but the ordinary mode in step S1808, the flow goes to steps in FIG. 17E.

Operations in the TTY modes TTY1, TTY2, and TTY3 and the ordinary mode have already been described before with reference to FIGS. 17B to 17E. Therefore, further explanations for those modes are omitted herein.

Fifth Embodiment

According to the above-described embodiments of the present invention, when the radio communication apparatus has received character signals from the TTY telephone, if the user is hard of reading, the user can not understand text messages displayed based on the character signals. Also when the user has input character streams with the input unit 12 (64, 117) and resulting character signals have been sent to the TTY telephone, if a party holding the TTY telephone cannot or has a limited capacity to read (i.e. is hard of reading) the party cannot understand text messages displayed based on the character signals.

Therefore, the radio communication apparatus according to a fifth embodiment of the present invention includes transforming means for transforming character streams into speech signals.

The transforming means may comprise, for example, software stored in the memory 14 (66, 119) and executed in the controller 11 (63, 116). Such software includes a database of words or sentences for the transformation. When the character signals have been received from the TTY telephone, the transforming means transforms character streams provided from the TTY demodulator 10 (1221) into speech signals. The transformed speech signals are provided to the reception amplifier 6. The speech signals amplified in the reception amplifier 6 are output from the speaker 7 as voice messages based on the character signals. When the character streams have been input from the input unit 12 (64, 117), the transforming means transforms the character streams into speech signals. The transformed speech signals are provided to the TTY modulator 62 (1222) and are sent to the TTY telephone through the base station and output as voice messages.

The transforming means may alternatively comprise, for example, a transforming unit including software similar to the above and a database unit similar to the above. The transforming unit and the database unit may be provided independent of the controller 11 (63, 116), respectively. Operations by the transforming unit may be similar to those by the transforming means executed in the controller 11 (63, 116). Those skilled in the art will appreciate that such units may be implemented using one or more appropriately programmed signal processors or other logic hardware.

Figure 19:
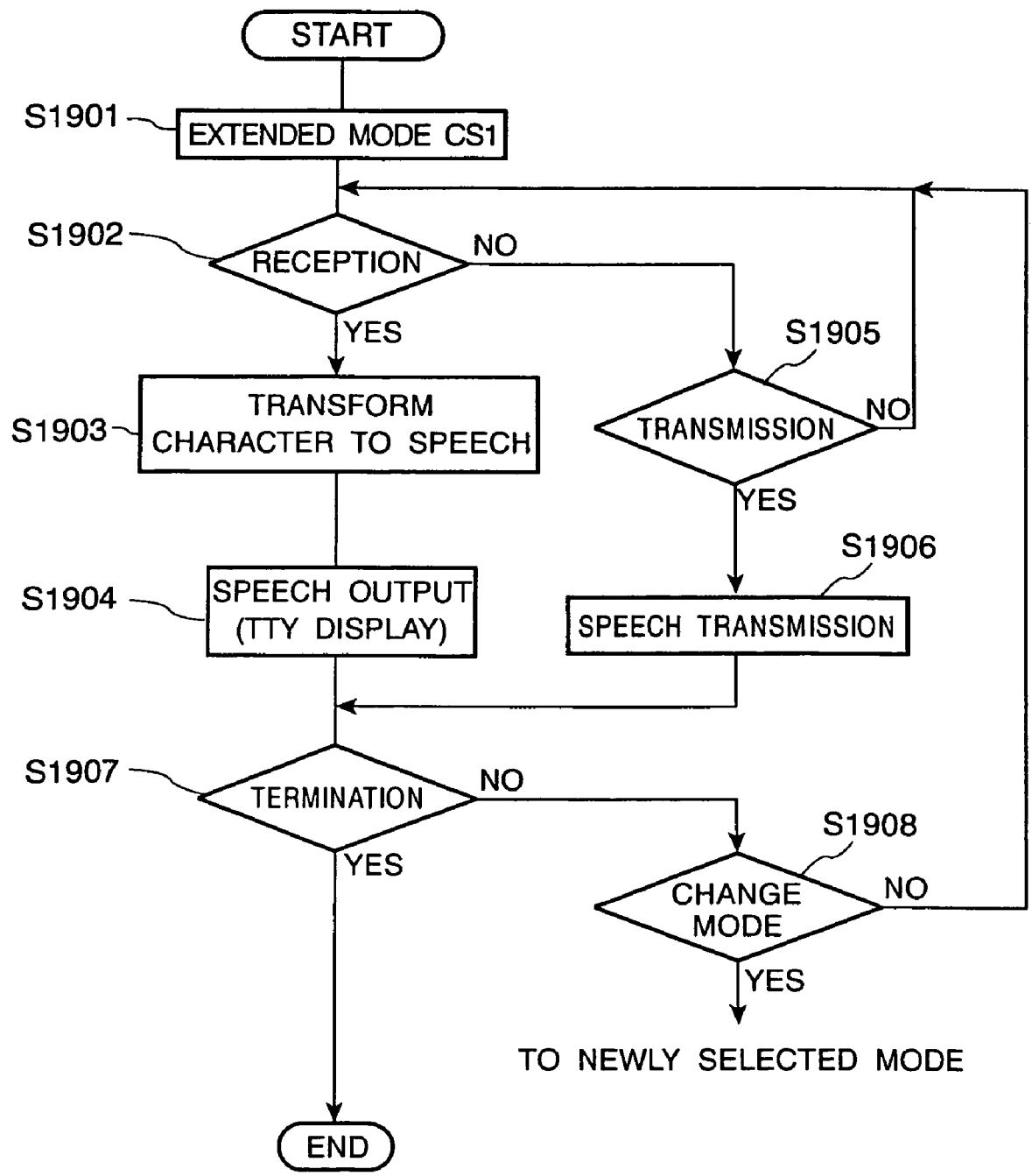
FIG. 19 is a flowchart showing a first example of communication by the radio communication apparatus according to a fifth embodiment of the present invention.

FIG. 19 is a flowchart showing an example of communication with the TTY telephone by the radio communication apparatus according to the fifth embodiment of the present invention. FIG. 19 shows an extended mode CS1 wherein character signals received from the TTY telephone are transformed to speech signals. A feature of operations in the extended mode CS1 may be incorporated and used in the radio communication apparatus described in the first embodiment. The feature may also be incorporated and used in the radio communication apparatus according to the fourth embodiment when the TTY mode TTY1 is set up.

During the stand-by status or even during the communication, the radio communication apparatus enters into the extended mode CS1 in response to the user's designation of the extended mode CS1 with the input unit 12 (117) (step S1901).

In the extended mode CS1, when signals are received from the TTY telephone, through the base station over the radio link (step S1902), the received signals are decoded and converted to character streams, such as ASCII character streams, and then transformed into speech signals by the transforming means (step S1903). The transformed speech signals are output from the speaker 7 as voice messages (step S1904). Additionally, the character streams may also be displayed in the display 13 (118), if necessary. Whether displayed or not, the character streams may be stored as a log of the communication in the memory 14 (119).

While waiting for the signal reception, if the user talks to the microphone 8 (step S1905), speech signals based on the talks are modulated and transmitted as burst signals of a radio frequency (step S1906). During such a communication, the controller 11 (116) determines whether the communication is terminated or not by the on-hook switch or maybe by an on-hook operation at the TTY telephone's end (step S1907). While the communication is not terminated and continues, the controller 11 (116) also determines whether the operation mode is changed to other modes in response to the user's input operation with the input unit 12 (117) or not (step S1908). If the operation mode is not changed, the flow goes back to step S1902. When the controller 11 (116) has determined that the operation mode is changed, the flow goes to operations of an operation mode corresponding to a newly selected (changed) mode as the apparatus' operation mode. The newly selected mode is one of the TTY modes TTY1, TTY2 TTY3, the ordinary mode, extended modes CS2, CS3, SC1, SC2, and SC3.

During the communication in the extended mode CS1 when the controller 11 (116) has recognized the on-hook switch operation or the termination at the TTY telephone's end (step S1907), the communication is terminated.

Figure 20:
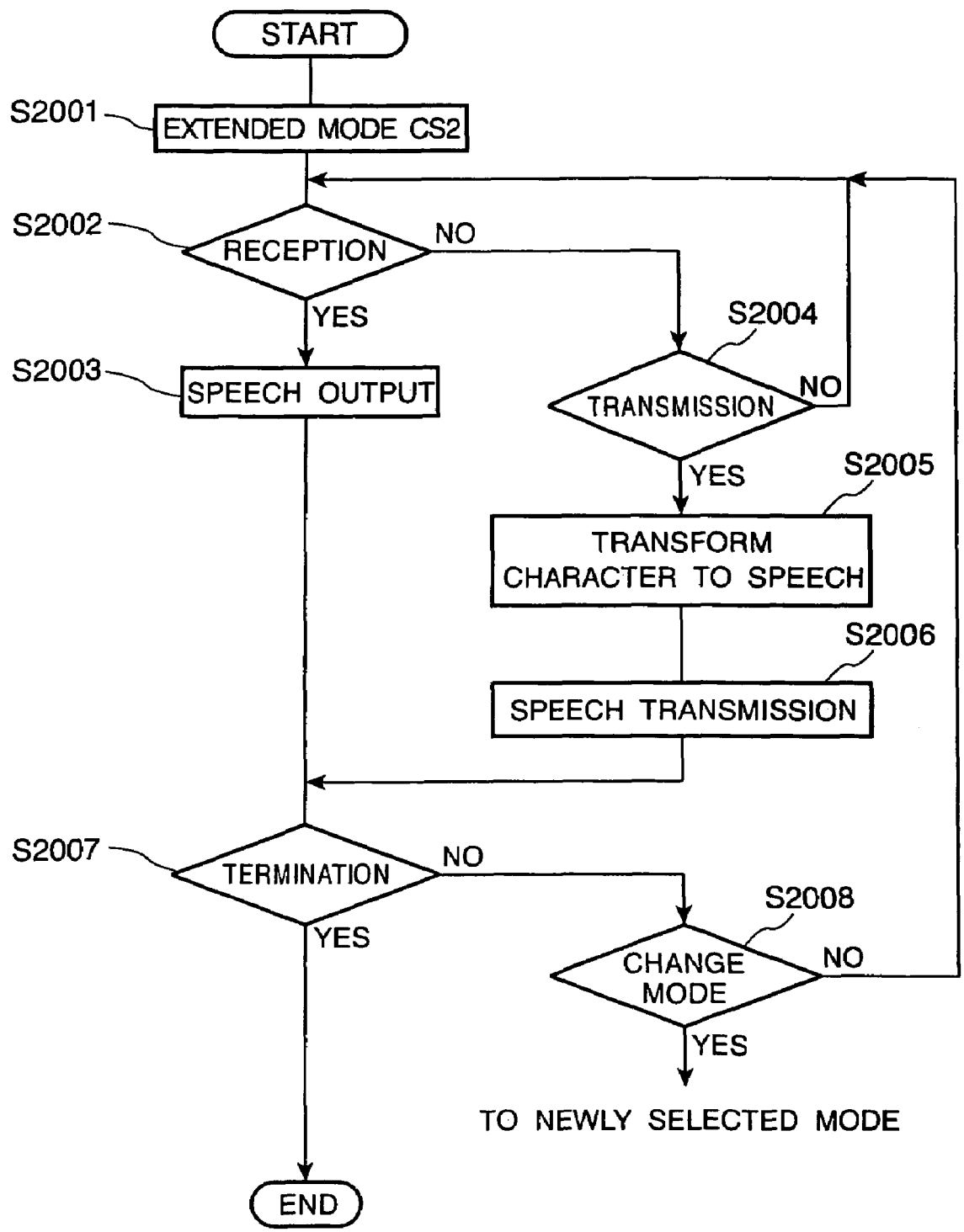
FIG. 20 is a flowchart showing a second example of communication by the radio communication apparatus according to the fifth embodiment of the present invention.

Another example of the radio communication apparatus according to the fifth embodiment will be described with reference to FIG. 20. FIG. 20 is a flowchart showing another example of communication with the TTY telephone by the radio communication apparatus according to the fifth embodiment of the present invention. FIG. 20 shows an extended mode CS2 wherein character signals input from the input unit 64 (117) are transformed to speech signals. A feature of operations in the extended mode CS2 may be incorporated and used in the radio communication apparatus described, in the second embodiment. The feature may also be incorporated and used in the radio communication apparatus according to the fourth embodiment when the TTY mode TTY2 is set up.

During the stand-by status or even during the communication, the radio communication apparatus enters into the extended mode CS2 in response to the user's designation of the extended mode CS2 with the input unit 64 (117) (step S2001).

In the extended mode CS2, when signals are received from the TTY telephone through the base station over the radio link (step S2002), the received signals are output from the speaker 7 as voice messages (step S2003).

While waiting for the signal reception, if the user inputs characters with the input unit 64 (117) (step S2004), character streams based on the character input operation are displayed in the display 65 (118). The character streams are also modulated to character signals and then transformed into speech signals (step S2005). The transformed speech signals are transmitted as burst signals of a radio frequency (step S2006). The input character streams may be stored as a log of the communication in the memory 66 (119).

During such a communication, the controller 63 (116) determines whether the communication is terminated or not by the on-hook switch or maybe by an on-hook operation at the TTY telephone's end (step S2007). While the communication is not terminated and continues, the controller 63 (116) also determines whether the operation mode is changed to other modes in response to the user's input operation with the input unit 64 (117) or not (step S2008). If the operation mode is not changed, the flow goes back to step S2002. When the controller 63 (116) has determined that the operation mode is changed, the flow goes to operations of an operation mode corresponding to a newly selected (changed) mode as the apparatus' operation mode. The newly selected mode is one of the TTY modes TTY1, TTY2, TTY3, the ordinary mode, extended modes CS1, CS3, SC1, SC2, and SC3.

During the communication in the extended mode CS2, when the controller 63 (116) has recognized the on-hook switch operation or the termination at the TTY telephone's end (step S2007), the communication is terminated.

Figure 21:
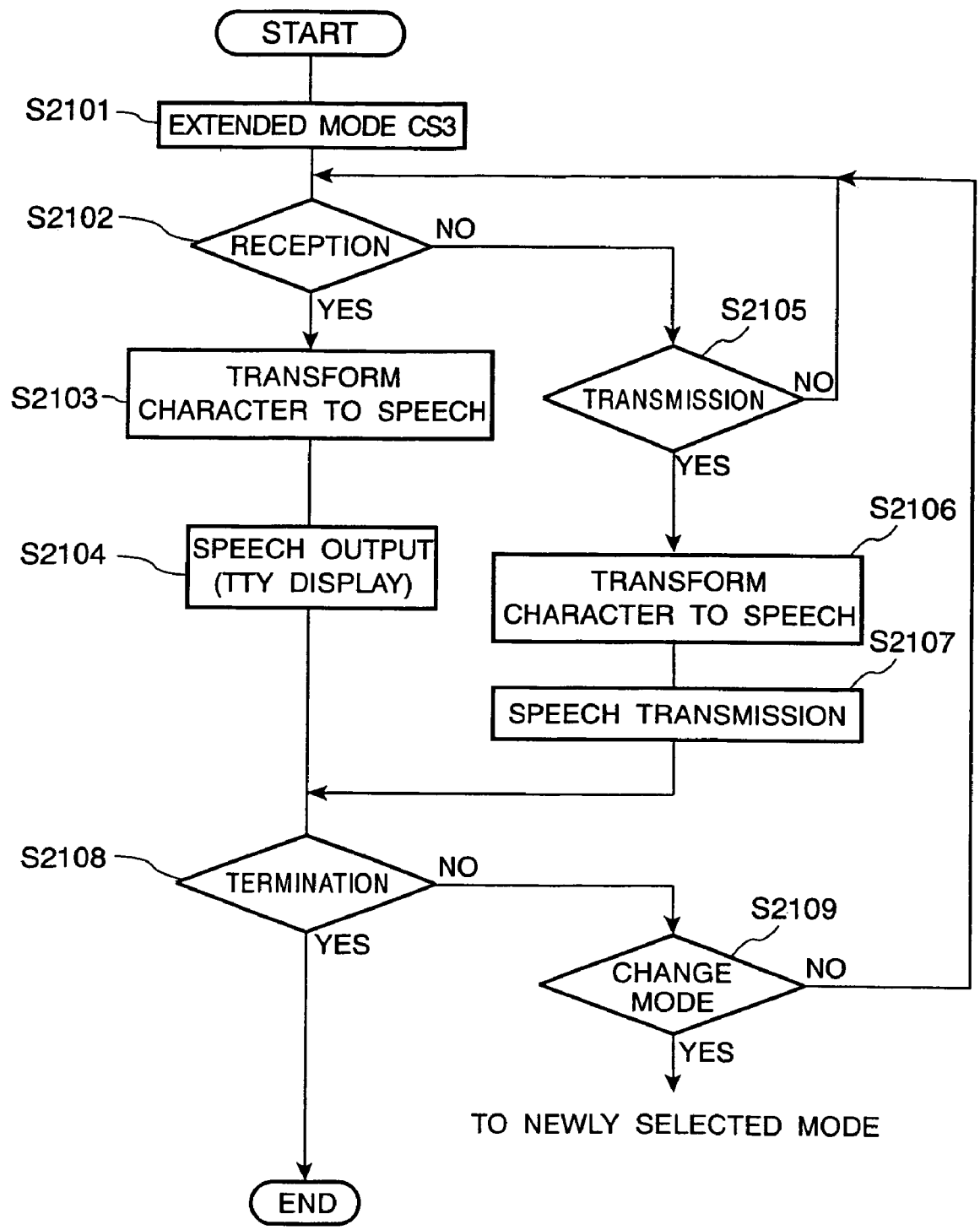
FIG. 21 is a flowchart showing a third example of communication by the radio communication apparatus according to the fifth embodiment of the present invention.

Still another example of the radio communication apparatus according to the fifth embodiment will be described with reference to FIG. 21. FIG. 21 is a flowchart showing still another example of communication with the TTY telephone by the radio communication apparatus according to the fifth embodiment of the present invention. FIG. 21 shows an extended mode CS3 wherein character signals both received from the TTY telephone and input by the user are transformed to speech signals. A feature of operations in the extended mode CS3 may be incorporated and used in the radio communication apparatus described in the third embodiment. The feature may also be incorporated and used in the radio communication apparatus according to the fourth embodiment when the TTY mode TTY3 is set up.

During the stand-by status or even during the communication, the radio communication apparatus enters into the extended mode CS3 in response to the user's designation of the extended mode CS3 with the input unit 117 (step S2101).

In the extended mode CS3, when signals are received from the TTY telephone through the base station over the radio link, (step S2102), the received signals are decoded and converted to character streams, such as ASCII character streams, and then transformed into speech signals by the transforming means (step S2103). The transformed speech signals are output from the speaker 7 as voice messages (step S2104). Additionally, the character streams may also be displayed in the display 118, if necessary. Whether displayed or not, the character streams may be stored as a log of the communication in the memory 119.

While waiting for the signal reception, if the user inputs characters with the input unit 117 (step S2105), character streams based on the character input operation are displayed in the display 118. The character streams are also modulated to character signals and then transformed into speech signals (step S2106). The transformed speech signals are transmitted as burst signals of a radio frequency (step S2107). The input character streams may be stored as a log of the communication in the memory 119.

During such a communication, the controller 116 determines whether the communication is terminated or not by the on-hook switch or maybe by an on-hook operation at the TTY telephone's end (step S2108). While the communication is not terminated and continues, the controller 116 also determines whether the operation mode is changed to other modes in response to the user's input operation with the input unit 117 or not (step S2109). If the operation mode is not changed, the flow goes back to step S2102. When the controller 116 has determined that the operation mode is changed, the flow goes to operations of an operation mode corresponding to a newly selected (changed) mode as the apparatus' operation mode. The newly selected mode is one of the TTY modes TTY1, TTY2, TTY3, the ordinary mode, extended modes CS1, CS2, SC1, SC2, and SC3.

During the communication in the extended mode CS3 when the controller 116 has recognized the on-hook switch operation or the termination at the TTY telephone's end (step S2108), the communication is terminated.

Sixth Embodiment

According to the first to fourth embodiments of the present invention, when the user has talked to the microphone 7 and resulting speech signals have been sent to the TTY telephone, if a party holding the TTY telephone is hard of hearing, the party cannot understand voice messages based on the user's talks. Also when the radio communication apparatus has received speech signals from the TTY telephone, if the user is hard of hearing, the user cannot understand voice messages output from the speaker 7 based on the speech signals.

Therefore, the radio communication apparatus according to a sixth embodiment of the present invention includes speech recognition means for recognizing speech signals and transforming means for transforming recognized speech signals into character streams.

The speech recognition means may comprise, for example, software stored in the memory 14 (66, 119) and executed in the controller 11 (63, 116). Also the transforming means may comprise, for example, software stored in the memory 14 (66, 119) and executed in the controller 11 (63, 116). Such transforming software includes a database of words or sentences for the transformation. When the speech signals have been received from the TTY telephone, the speech-recognized and transformed signals are provided to the display 13 (65, 118). The character signals provided to the display 13 (65, 118) are displayed as text messages based on the speech signals. When the speech signals have been input from the microphone 8, the speech-recognized and transformed signals are provided to the PCM codec 5. The character signals provided to the PCM codec 5 are sent to the TTY telephone through the base station and displayed as text messages.

The speech recognition means may alternatively comprise, for example, a speech recognition unit including software similar to the above. Further, the transforming means may alternatively comprise, for example, a transforming unit including software similar to the above and a database unit similar to the above. The speech recognition unit, the transforming unit, and/or the database unit may be provided independent of the controller 11 (63, 116). Operations by the speech recognition unit may be similar to those by the speech recognition means executed in the controller 11 (63, 116). Also operations by the transforming unit may be similar to those by the transforming means executed in the controller 11 (63, 116). Those skilled in the art will appreciate that such units may be implemented using one or more appropriately programmed signal processors or other logic hardware.

Figure 22:
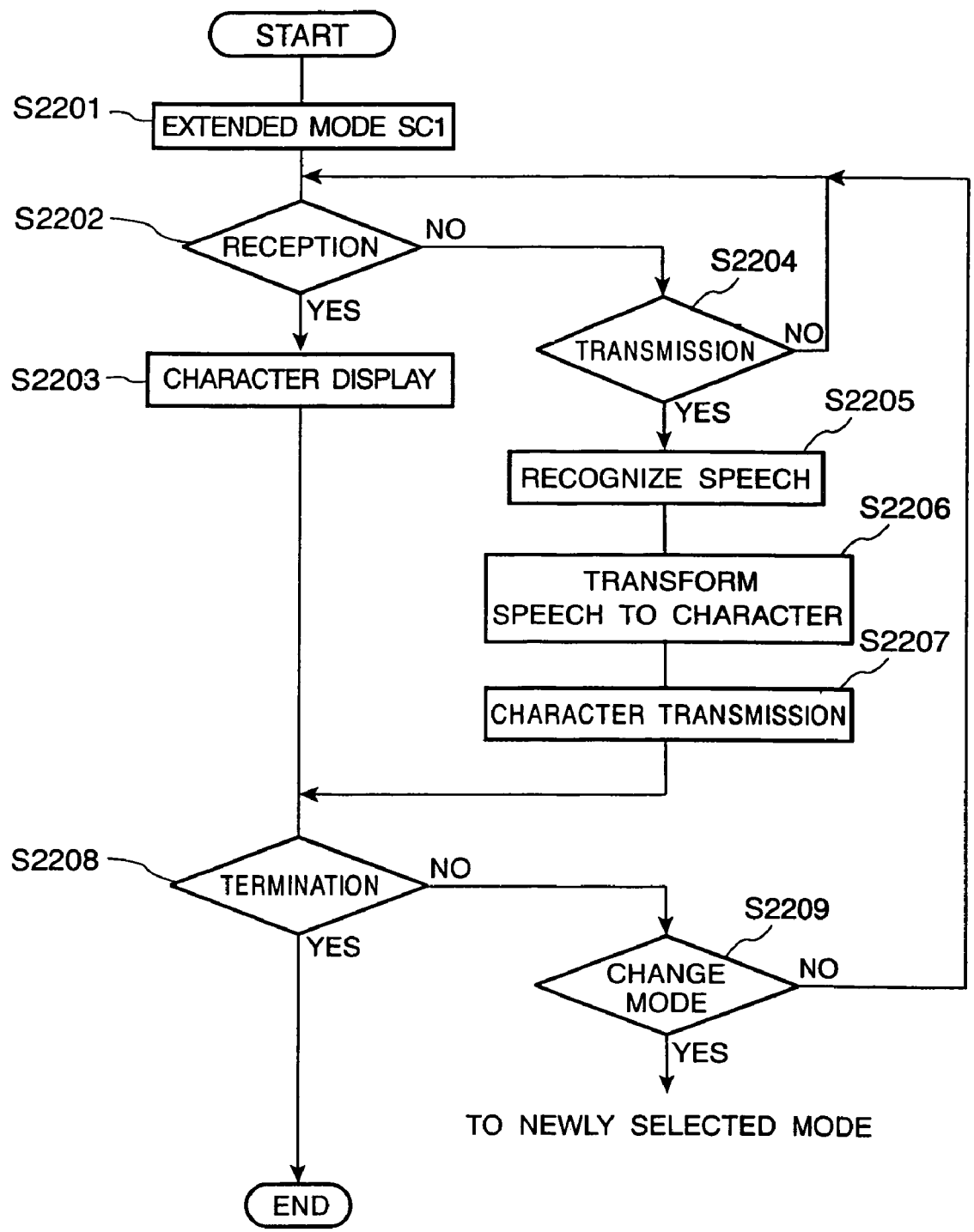
FIG. 22 is a flowchart showing a first example of communication by the radio communication apparatus according to a sixth embodiment of the present invention.

FIG. 22 is a flowchart showing an example of communication with the TTY telephone by the radio communication apparatus according to the sixth embodiment of the present invention. FIG. 22 shows an extended mode SC1 wherein speech signals input by the user are transformed into character streams for transmission. A feature of operations in the extended mode SC1 may be incorporated and used in the radio communication apparatus according to the fourth embodiment when the TTY mode TTY1 is set up.

During the stand-by status or even during the communication, the radio communication apparatus enters into the extended mode SC1 in response to the user's designation of the extended mode SC1 with the input unit 12 (117) (step S2201).

In the extended mode SC1, when signals are received from the TTY telephone through the base station over the radio link (step S2202), the received signals are decoded and converted to character streams, such as ASCII character streams, and then displayed as text messages in the display 13 (118) (step S2203). The displayed text messages may be stored as a log of the communication in the memory 14 (119).

While waiting for the signal reception, if the user talks to the microphone 8 (step S2204) speech signals based on the talks are provided to the controller 11 (116) and speech-recognized by the speech recognition means (step S2205). The recognized speech signals are transformed into character streams by the transforming means (step S2206). The transformed character signals are provided to the TTY modulator 62 (1222) and transmitted as burst signals of a radio frequency (step S2207).

During such a communication, the controller 11 (116) determines whether the communication is terminated or not by the on-hook switch or maybe by an on-hook operation at the TTY telephone's end (step S2208). While the communication is not terminated and continues, the controller 11 (116) also determines whether the operation mode is changed to other modes in response to the user's input operation with the input unit 12 (117) or not (step S2209). If the operation mode is not changed, the flow goes back to step S2202. When the controller 11 (116) has determined that the operation mode is changed, the flow goes to operations of an operation mode corresponding to a newly selected (changed) mode as the apparatus' operation mode. The newly selected mode is one of the TTY modes TTY1, TTY2, TTY3, the ordinary mode, extended modes CS1, CS2, CS3, SC2, and SC3.

During the communication in the extended mode SC1, when the controller 11 (116) has recognized the on-hook switch operation or the termination at the TTY telephone's end (step. S2208), the communication is terminated.

Figure 23:
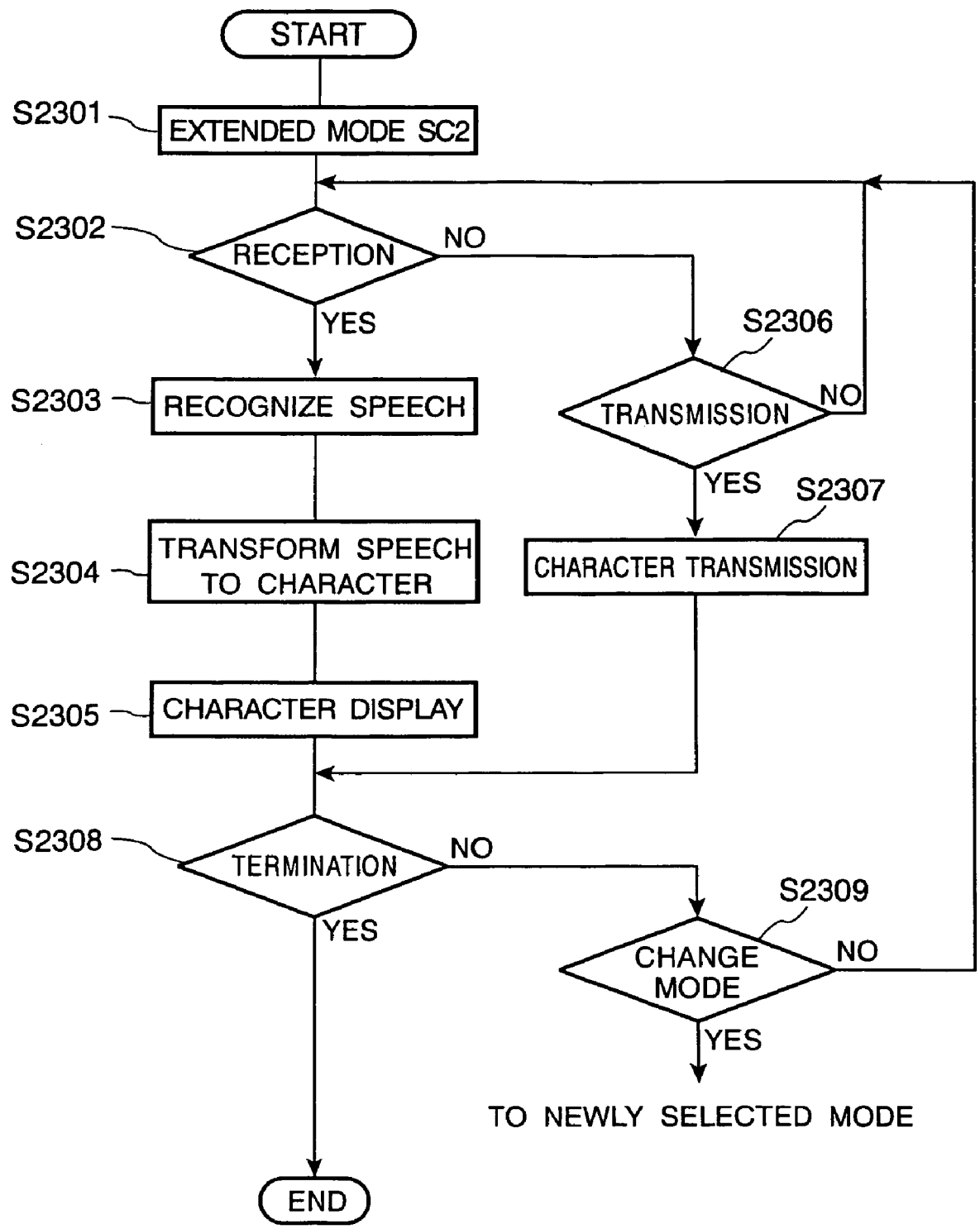
FIG. 23 is a flowchart showing a second example of communication by the radio communication apparatus according to the sixth embodiment of the present invention.

Another example of the radio communication apparatus according to the sixth embodiment will be described with reference to FIG. 23. FIG. 23 is a flowchart showing another example of communication with the TTY telephone by the radio communication apparatus according to the sixth embodiment of the present invention. FIG. 23 shows an extended mode SC2 wherein speech signals received from the TTY telephone are transformed to character streams. A feature of operations in the extended mode SC2 may be incorporated and used in the radio communication apparatus described in the second embodiment. The feature may also be incorporated and used in the radio communication apparatus according to the fourth embodiment when the TTY mode TTY2 is set up.

During the stand-by status or even during the communication, the radio communication apparatus enters into the extended mode SC2 in response to the user's designation of the extended mode SC2 with the input unit, 64 (117) (step S2301).

In the extended mode SC2, when signals are received from the TTY telephone through the base station over the radio link (step S2302), the received signals are provided to the controller 63 (116). In the controller 63 (116), the speech signals are speech-recognized by the speech recognition means (step S2303). The recognized speech signals are transformed into character streams by the transforming means (step S2304). The transformed character streams are provided to the display 65 (118) and displayed as text messages based on the received signals (step S2305). The displayed text messages may be stored as a log of the communication in the memory 66 (119).

While waiting for the signal reception, if the user inputs character with the input unit 64 (117) (step S2306), character streams based on the character input operation, such as ASCII character streams, representing the text messages are displayed in the display 65 (118). The character streams are also coded and converted to character signals. The character signals are transmitted as burst signals of a radio frequency (step S2307). The input character streams may be stored as a log of the communication in the memory 66 (119).

During such a communication, the controller 63 (116) determines whether the communication is terminated or not by the on-hook switch or maybe by an on-hook operation at the TTY telephone's end (step S2308). While the communication is not terminated and continues, the controller 63 (116) also determines whether the operation mode is changed to other modes in response to the user's input operation with the input unit 64 (117) or not (step S2309). If the operation mode is not changed, the flow goes back to step S2302. When the controller 63 (116) has determined that the operation mode is changed, the flow goes to operations of an operation mode corresponding to a newly selected (changed) mode as the apparatus' operation mode. The newly selected mode is one of the TTY modes TTY1, TTY2, TTY3, the ordinary mode, extended modes CS1, CS2, CS3, SC1, and SC3.

During the communication in the extended mode SC2, when the controller 63 (116) has recognized the on-hook switch operation or the termination at the TTY telephone's end (step S2308), the communication is terminated.

Figure 24:
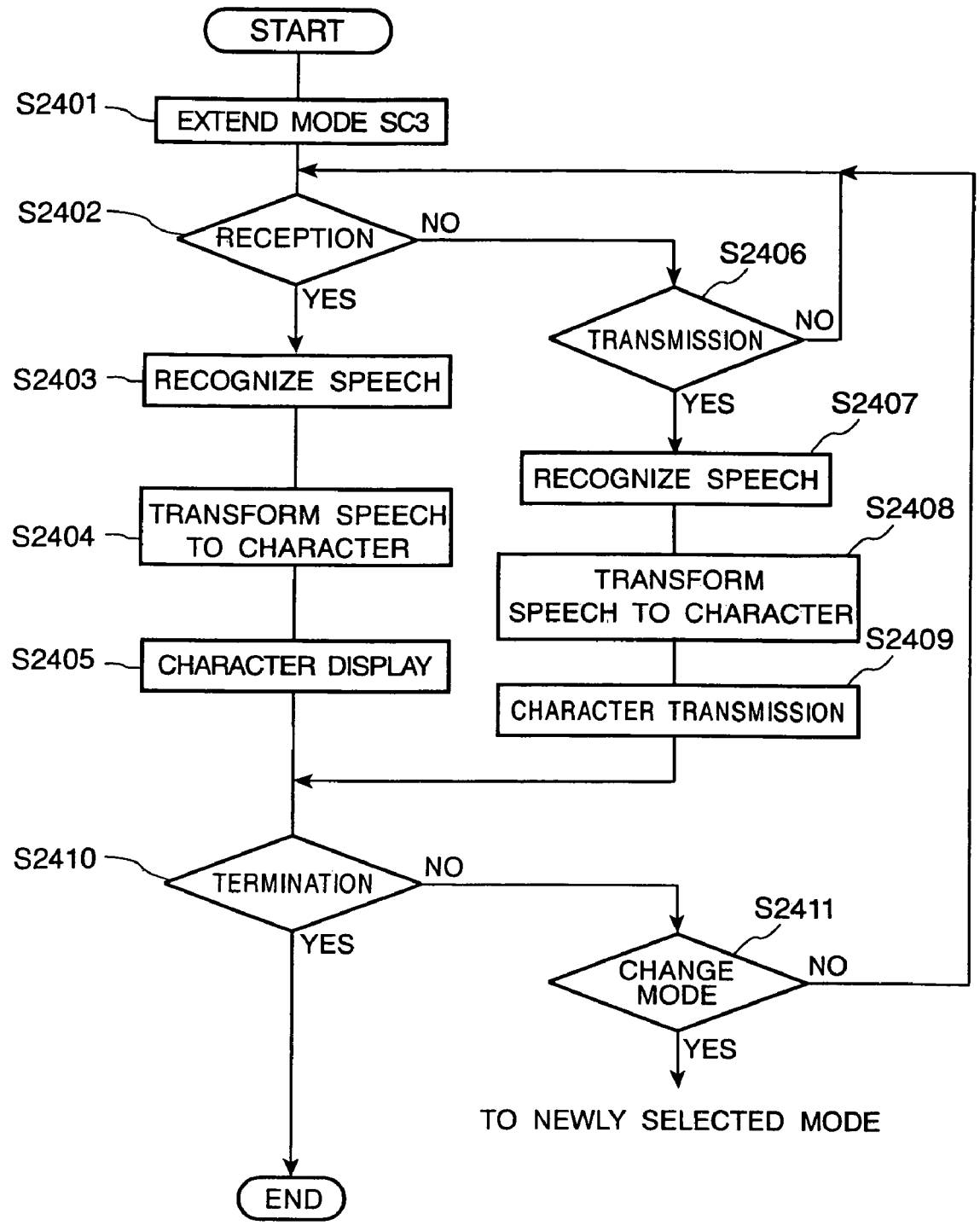
FIG. 24 is a flowchart showing a third example of communication by the radio communication apparatus according to the sixth embodiment of the present invention.

Still another example of the radio communication apparatus according to the sixth embodiment will be described with reference to FIG. 24. FIG. 24 is a flowchart showing still another example of communication with the TTY telephone by the radio communication apparatus according to the sixth embodiment of the present invention. FIG. 24 shows an extended mode SC3 wherein speech signals both received from the TTY telephone and input by the user are transformed to character streams. A feature of operations in the extended mode SC3 may be incorporated and used in the radio communication apparatus described in the third embodiment. The feature may also be incorporated and used in the radio communication apparatus according to the fourth embodiment when the TTY mode TTY3 is set up.

During the stand-by status or even during the communication, the radio communication apparatus enters into the extended mode SC3 in response to the user's designation of the extended mode SC3 with the input unit 117 (step S2401).

In the extended mode SC3, when signals are received from the TTY telephone through the base station over the radio link (step S2402), the received signals are provided to the controller 116. In the controller 116, the speech signals are speech-recognized by the speech recognition means (step S2403). The recognized speech signals are transformed into character streams by the transforming means (step S2404). The transformed character streams are provided to the display 118 and displayed as text messages based on the received signals (step S2405). The displayed text messages may be stored as a log of the communication in the memory 119.

While waiting for the signal reception, if the user talks to the microphone 8 (step S2406), speech signals based on the talks are provided to the controller 116 and speech-recognized by the speech recognition means (step S2407). The recognized speech signals are transformed into character streams by the transforming means (step S2408). The transformed character signals are provided to the TTY modulator 1222 and transmitted as burst signals of a radio frequency (step S2409).

During such a communication, the controller 116 determines whether the communication is terminated or not by the on-hook switch or maybe by an on-hook operation at the TTY telephone's end (step S2410). While the communication is not terminated and continues, the controller 116 also determines whether the operation mode is changed to other modes in response to the user's input operation with the input unit 117 or not (step S2411). If the operation mode is not changed, the flow goes back to step S2402. When the controller 116 has determined that the operation mode is changed, the flow goes to operations of an operation mode corresponding to a newly selected (changed) mode as the apparatus' operation mode. The newly selected mode is one of the TTY modes TTY1, TTY2, TTY3, the ordinary mode, extended modes CS1, CS2, CS3, SC1, and SC2.

During the communication in the extended mode SC3, when the controller 116 has recognized the on-hook switch operation or the termination at the TTY telephone's end (step S2410), the communication is terminated.

As described above, according to the embodiments of the present invention, the user of the radio communication apparatus can communicate with the party holding the TTY telephone without a conventional TTY terminal. Particularly, the user can select one of the various types of the radio communication apparatuses or of operation modes which is appropriate for the purpose of using the TTY feature or for communications with the party the user communicates.

In use of the radio communication apparatus according to the embodiments of the present invention, various types of combinations are conceivable for communications between the TTY telephone and the radio communication apparatus. FIGS. 25A and 25B are tables showing exemplary combinations of communications between the TTY telephone and the radio communication apparatus when operated according to the fourth embodiment of the present invention.

FIG. 25A shows exemplary combinations when the TTY telephone is a radio or wired telephone connected to a TTY terminal. In case 2, for example, when the party holding such a TTY telephone (TTY holder) is able to hear but cannot speak or has a limited speaking capability (i.e., hard of speaking) with the user (who does not have any problem in communications), of the radio communication apparatus according to the fourth embodiment, the TTY holder inputs characters with a keyboard of the TTY terminal and sends text messages to the radio communication apparatus. The user can recognize the TTY holder's messages in the display 118, and answers in speech by talking to the microphone 8. Since the TTY holder can hear, the TTY holder can hear the user's answer from a speaker of the TTY telephone. In the above communication, the radio communication apparatus is operative in the TTY mode TTY1.

Also FIG. 25B shows exemplary combinations when the TTY telephone is a radio communication according to the fourth embodiment of the present invention. In case 11, for example, when a user of the radio communication apparatus according to the fourth embodiment (user 1) is able to hear but cannot speak or has a limited speaking capability (i.e., hard of speaking) with the other user who is hard of hearing but manages to speak (user 2), the user 1 inputs characters with the input unit 117 and sends text messages to the radio communication apparatus of the user 2. The user 2 can recognize the messages of the user 1 in the display 118, and answers in speech by talking to the microphone 8. In response to the talks, the user 1 can hear the answer of the user 2 from the speaker 7. In the above communication, the radio communication apparatus of the user 1 is operative in the TTY mode TTY2. While the radio communication apparatus of the user 2 is operative in the TTY mode TTY1.

In FIGS. 25A and 25B, when the radio communication apparatus is operative in TTY mode TTY1, the radio communication apparatus according to the first embodiment may alternatively applied for the use. In addition, when the radio communication apparatus is operative in TTY mode TTY2, the radio communication apparatus according to the second embodiment may alternatively applied for the use. Further, when the radio communication is operative in TTY mode TTY3, the radio communication apparatus according to the third embodiment may alternatively applied for the use.

As shown in FIGS. 25A and 25B, a use of the radio communication apparatus according to the embodiments of the present invention makes it possible for the normal user to communicate with a communication-impaired person and vice versa.

Regarding the operations described in the embodiments of the present invention, one or more units, such as, for example, the controller 11 (63, 116) and/or the memory 14 (66, 119), of the radio communication apparatus may be connected to and receive and store computer programs, applications, and/or databases as computer readable instructions from a hard disk drive, which is independently provided or provided appropriately in a predetermined apparatus, for reading from and writing to a hard disk (such as a flash memory module), a magnetic disk drive for reading from and writing to a magnetic disk, and/or an optical disk drive for reading from and writing to an optical disk (such as a CD; CDR, CD-RW, DVD, or other optical device). Those skilled in the art will appreciate that one or more of such memory, drives, and their respective media are examples of a computer program product for storing computer readable instructions, which when executed, may implement an embodiment of the present invention.

Accordingly, a radio communication apparatus which does not originally incorporate software features of an embodiment of the present invention can benefit the features as long as the radio communication apparatus is equipped with a feature of a TTY modulator and/or a TTY demodulator as well as a feature of reading and performing computer readable programs although the computer programs may be required to be customized to comply with specifications of the radio communication apparatus, if necessary.

The embodiments of the present invention described above are examples described only for making it easier to understand the present invention, and are not described for the limitation of the present invention. Consequently, each component and element disclosed in the embodiments of the present invention may be redesigned or modified to its equivalent within a scope of the present invention. Furthermore, any possible combination of such components and elements may be included in a scope of the present invention as long as an advantage similar to those obtained according to the above disclosure in the embodiments of the present invention is obtained.

What is claimed is:

1. A radio communication apparatus for use in a radio communication system having a radio link between a base station and the radio communication apparatus, the apparatus comprising:

a receiver configured to receive a first audio signal from the radio link;

a microphone configured to generate a second audio signal;

an input unit configured to input a first identification number;

a PCM codec configured to code the second audio signal generated by the microphone into a PCM signal;

a speech codec configured to decode the first audio signal received by the receiver into a first character signal and to code the PCM signal output from the PCM codec into a second character signal;

a demodulator configured to demodulate the first character signal into character data;

a display unit configured to display the character data from the demodulator;

a transmitter configured to transmit the second character signal from the speech codec to the radio link;

a processor configured to detect whether the first identification number is included in the first audio signal received by the receiver;

an ID table configured to store a second identification number; and a control unit configured to execute first control and second control, the first control checking whether or not the first identification number detected by the processor belongs to the second identification number stored in the ID table, the first control further displaying the character data corresponding to the first audio signal in the display unit when the detected first identification number belongs to the second identification number, the second control checking whether or not the first identification number is inputted by the input unit, the second control further transmitting the second character signal corresponding to the second audio signal from the transmitter to the radio link when the first identification number inputted by the input unit belongs to the second identification number stored the ID table.

2. A radio communication apparatus for use in a radio communication system having a radio link between a base station and the radio communication apparatus, the apparatus comprising:

a receiver configured to receive a first character signal from the radio link;

an input unit configured to input a second character signal and first identification number;

a modulator configured to modulate the second character signal into second character data;

a speech codec configured to decode the first character signal received by the receiver into an audio signal, and code the second character data output from the modulator;

a transmitter configured to transmit the second character data from the speech codec to the radio link;

a PCM codec configured to decode the audio signal output from the speech codec into a PCM signal;

a speaker configured to output a voice of the PCM signal output from the PCM codec;

an ID table configured to store a second identification number;

a processor configured to detect whether the first identification number is included in the first character signal received by the receiver; and a control unit configured to execute first control and second control, the first control checking whether or not the first identification number detected by the processor belongs to the second identification number stored in the ID table, the first control further outputting the voice of the PCM signal corresponding to the first character signal to the speaker when the detected first identification number belongs to the second identification number, the second control checking whether or not the first identification number is inputted by the input unit, the second control further transmitting the second character data corresponding to the second character signal from the transmitter to the radio link when the first identification number inputted by the input unit belongs to the second identification number stored in the ID table.

3. A radio communication apparatus for use in a radio communication system having a radio link between a base station and the radio communication apparatus, the apparatus comprising:

a receiver configured to receive a first audio signal or a first character signal from the radio link;

a microphone configured to generate a second audio signal;

an input unit configured to input a first identification number or a first identification number and second character signal;

a modulator configured to modulate a second character signal inputted by the input unit into a second character data;

a first PCM codec configured to code the second audio signal generated by the microphone into a first PCM signal;

a speech codec configured to decode the first audio signal received by the receiver into a display character signal and code the first PCM signal output from the first PCM codec into a transmission character signal, the speech codec further configured to decode the first character signal by the receiver into a telephone call signal and code the second character data output from the modulator, and to output the telephone call signal;

a demodulator configured to demodulate the display character signal into display data;

a display unit configured to display the display data output from the demodulator;

a transmitter configured to transmit the transmission character signal and second character data from the speech codec to the radio link;

a second PCM codec configured to decode the telephone call signal output from the speech codec to a second PCM signal;

a speaker configured to output a voice of the second PCM signal output from the second PCM codec;

a processor configured to detect whether the first identification number is included in the first audio signal or the first character signal received by the receiver;

an ID table configured to store a second identification number; and a control unit configured to execute a first control, second control, third control, and fourth control, the first control checking whether or not the first identification number detected by the processor belongs to the second identification number stored in the ID table, the first control further displaying the display data corresponding to the first audio signal in the display unit when the detected first identification number belongs to the second identification number, the second control checking whether or not the first identification number is inputted by the input unit, the second control further transmitting the transmission character signal corresponding to the second audio signal from the transmitter to the radio link when the first identification number inputted by the input unit belongs to the second identification number stored in the ID table, the third control checking whether or not the first identification number detected by the processor belongs to the second identification number stored in the ID table, the third control further outputting the voice of the second PCM signal corresponding to the first character signal to the speaker when the detected first identification number belongs to the second identification number, fourth control checking whether or not the first identification number is inputted by the input unit, the fourth control further transmitting the second character data corresponding to the second character signal from the transmitter to the radio link when the first identification number inputted by the input unit belongs to the second identification number stored the ID table.

4. A method for processing a signal received in a radio communication apparatus for use in a radio communication system wherein the received signal is transmitted over a radio link from a base station to the radio communication apparatus, the method comprising:

receiving a first character signal from the radio link by a receiver when the radio communication apparatus is in a first mode;

detecting whether or not a first identification number is included in the first character signal received by the receiver;

detecting whether or not the detected first identification number is included in a second identification number stored in an ID table, decoding the first character signal into an audio signal when the first identification number belongs to the second identification number;

decoding the audio signal into a PCM signal;

outputting a voice signal of the PCM signal to a speaker;

inputting a second audio signal by a microphone when the radio communication apparatus is in the first mode;

inputting a second character signal and the first identification number by an input unit;

detecting whether or not the first identification number inputted from the input unit is included in the second identification number stored into the ID table;

modulating the second character signal from the input unit when the first identification number belongs to the second identification number;

coding the second character signal; and transmitting character data of the second character signal to the radio link.

5. A radio communication apparatus for use in a radio communication system having a radio link between a base station and the radio communication apparatus, the apparatus comprising:

a receiver configured to receive a first audio signal from the radio link;

a microphone configured to generate a second audio signal;

an input unit configured to input a first identification number;

a codec unit configured to decode the first audio signal received by the receiver into a first character signal and to code the second audio signal generated by the microphone;

a demodulator configured to demodulate the first character signal into character data;

a display unit configured to display the character data supplied from the demodulator;

a transmitter configured to transmit the second character signal from the codec unit to the radio link;

a processor configured to detect whether the first identification number is included in the first audio signal received by the receiver;

an ID table configured to store a second identification number;

a control unit configured to execute first control and second control, the first control checking whether or not the first identification number detected by the processor belongs to the second identification number stored in the ID table, the first control further displaying the character data corresponding to the first audio signal in the display unit when the detected first identification number belongs to the second identification number, the second control checking whether or not the first identification number is input by the input unit, the second control further transmitting the second character signal corresponding to the second audio signal from the transmitter to the radio link when the first identification number inputted by the input unit belongs to the second identification number stored in the ID table.

* * * * *